(12) United States Patent
Hamada et al.

(10) Patent No.: US 6,205,296 B1
(45) Date of Patent: Mar. 20, 2001

(54) FILM INFORMATION WRITING DEVICE, FILM INFORMATION READING DEVICE AND FILM INFORMATION HANDLING DEVICE

(75) Inventors: Masataka Hamada, Osakasayama; Yasuaki Serita, Sakai, both of (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/208,006

(22) Filed: Dec. 9, 1998

(30) Foreign Application Priority Data

| Dec. 12, 1997 | (JP) | ................................................ 9-342942 |
| Sep. 3, 1998 | (JP) | ............................................... 10-249674 |
| Sep. 3, 1998 | (JP) | ............................................... 10-249675 |

(51) Int. Cl.[7] ........................... G03B 17/24; G03B 13/10; G03B 17/00
(52) U.S. Cl. ........................ 396/311; 396/315; 396/435; 396/436; 396/380
(58) Field of Search ................................ 396/60, 310, 311, 396/315, 317, 318, 319, 380, 435, 436

(56) References Cited

U.S. PATENT DOCUMENTS

| 4,583,831 | * | 4/1986 | Harvey | .................................. 396/318 |
| 4,639,111 | | 1/1987 | Harvey | .................................. 390/60 |
| 4,928,124 | * | 5/1990 | Taniguchi et al. | ..................... 396/60 |
| 5,021,815 | * | 6/1991 | Harvey | .................................. 396/60 |
| 5,086,311 | * | 2/1992 | Naka et al. | ........................... 396/436 |
| 5,389,991 | * | 2/1995 | Naka et al. | ........................... 396/315 |
| 5,742,854 | * | 4/1998 | Saito et al. | ........................... 396/311 |
| 5,895,134 | * | 4/1999 | Freeman et al. | ...................... 396/319 |

FOREIGN PATENT DOCUMENTS

| 0 458 369 A2 | 11/1991 | (EP) . |
| 54-26721 | 2/1979 | (JP) . |

* cited by examiner

Primary Examiner—Eddie C. Lee
(74) Attorney, Agent, or Firm—Burns, Doane, Swecker & Mathis, LLP

(57) ABSTRACT

The present invention provides a device and method for enabling the writing of a print format and a trimming magnification onto a film surface using a simple construction. Film information comprising a print format set using a format setting switch 10 and a trimming magnification set using a trimming setting switch 11 is converted into three-bit data by a data conversion circuit 26 inside a controller 25. This information is input to an LED light emission controller 27. Photoemitter elements 17 and 18 are located in the feeding path for the top and bottom edge areas of the film F, and a LED light emission controller 27 causes the photoemitter elements 17 and 18 to emit light during a series of image recording operations, whereby the film information is written onto the top and bottom edge areas of the film F. By optically writing the print format information and the trimming information onto the film F, both items of information can be easily written onto the film surface without making the device complex.

36 Claims, 13 Drawing Sheets

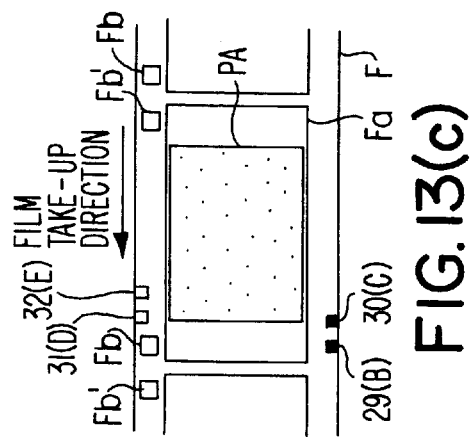
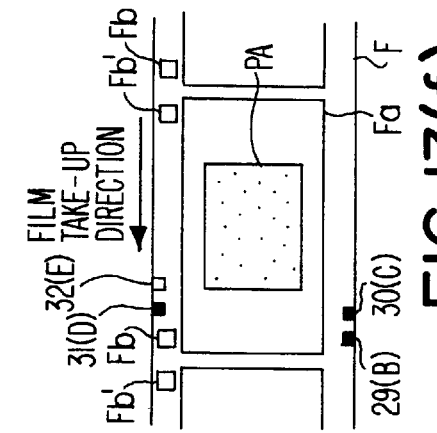
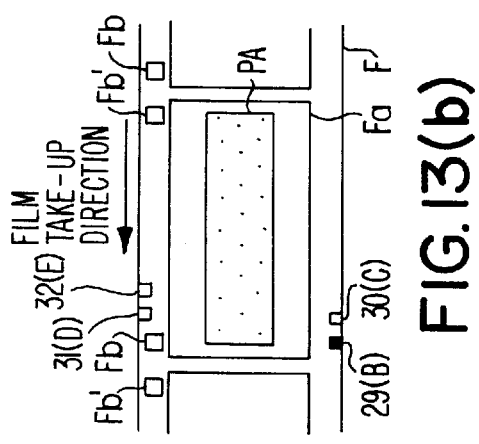
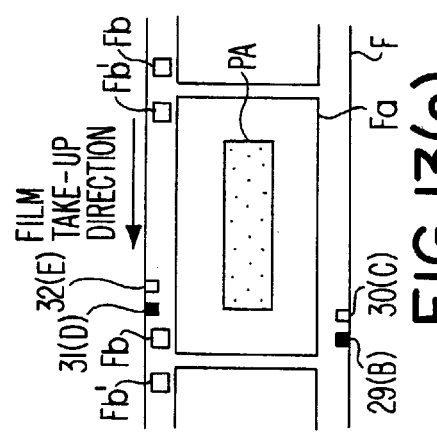
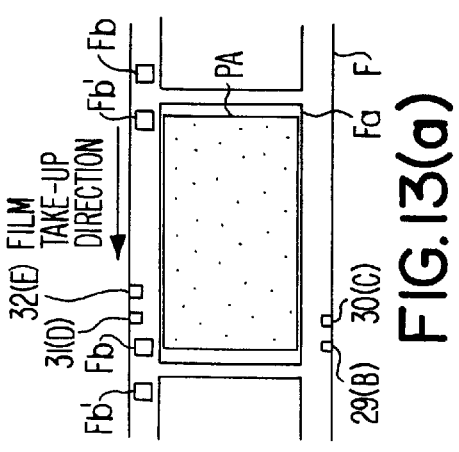
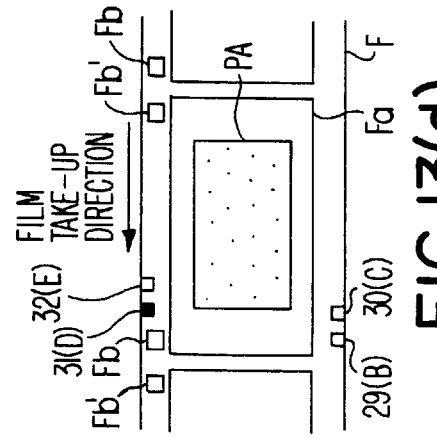

FILM INFORMATION WRITING DEVICE, FILM INFORMATION READING DEVICE AND FILM INFORMATION HANDLING DEVICE

This application is based on Japanese Patent Application No. 09-342942, filed on Dec. 12, 1997, No. 10-249674, filed on Sep. 3, 1998 and No. 10-249675 filed on Sep. 3, 1998. All three of these application documents are incorporated by reference herein.

BACKGROUND

1. Field of the Invention

The present invention pertains to (a) a film information writing device that writes film information and that is used in a photographic system in which (i) predetermined film information comprising print format information and trimming information is recorded onto the film surface of rolled film during image recording, and (ii) the images captured on each frame of the rolled film are printed on photographic paper or displayed on a display device in accordance with the film information, as well as (b) a camera equipped with said device.

2. Related Art

In related technology, print format information that represents a print format (aspect ratio) for the exposed frame is optically or magnetically recorded onto the film surface. A system has also been proposed in which the trimming information representing the magnification for printing a part of the image in the exposed frame in enlargement is written onto the film surface. Japanese Laid-Open Patent Application Sho 54-26721 discloses a system wherein a finder view-field size may be optically changed and the trimming information is optically written onto the film surface in tandem with the finder view-field size.

U.S. Pat. No. 4,639,111 discloses a system in which a code that indicates a pseudo-panorama or pseudo-telephoto format is optically recorded next to the frames of the film.

However, in these conventional examples, both the print format information and the trimming information cannot be set. That is, a desired print format and a desired trimming magnification cannot be set together.

Further, even if it is possible to set format information and trimming information together, there are combinations of format information and trimming information in which useful prints cannot be obtained. In other words, where the trimming magnification is too large, the image becomes excessively enlarged during printing, which leads to a deterioration in image quality. There is a limit (upper limit) to the trimming magnification that may be effectively set, and this limit varies depending on the print format.

SUMMARY

The present invention resolves at least the above-identified problems. An exemplary object of the invention is to provide an image recording device in which print format information and trimming information may both be set. Another object of the invention is to provide an information writing device having a simple construction that can perform writing onto the film.

Another object of the present invention is to provide an information reading device that can read the print format information and the trimming information from the film onto which these information items are recorded.

According to exemplary embodiments, the invention comprises a film information writing device that writes film information comprising print format information regarding a print format and trimming information regarding a trimming area of an original image onto the film. The film information writing device includes: a format information setting device for selectively setting print format information from among multiple preset print formats; a trimming information setting device for selectively setting trimming information from among preset multiple trimming information items; a data converter for converting the film information set by means of the format information setting device and the trimming information setting device into prescribed data comprising a bit pattern; a first data writing device for writing onto the film the data corresponding to the print format information output from the data converter; and a second data writing device for writing onto the film the data corresponding to the trimming information output from the data converter.

According to another exemplary embodiment, the invention comprises a film information reading device that reads film information written onto the film. The device includes: a first data reading device for reading data corresponding to print format information written onto the film; a second data reading device for reading data corresponding to trimming information written onto the film; and an information determining device that determines the print format information and the trimming information from the data read by the first and second data reading devices, respectively.

BRIEF DESCRIPTION OF THE DRAWINGS

The foregoing, and other, objects, features and advantages of the present invention will be more readily understood upon reading the following detailed description in conjunction with the drawings in which:

FIGS. 13(a)–13(i) (collectively referred to as FIG. 13) constitute a drawing showing the location at which the trimming magnification is written onto the film when the maximum available trimming magnification is limited to ×2.0 in Table 4 (described below), wherein FIGS. 13(a) through 13(c) show the data of Nos. 1, 5 and 9 written onto the film surface, FIGS. 13(d) through 13(f) show the data of Nos. 2, 6 and 10 written onto the film surface, and FIGS. 13(g) through 13(i) show the data of Nos. 3, 7 and 11 written onto the film surface;

DESCRIPTION OF THE PREFERRED EMBODIMENTS

The film information handling device equipped with the film information reading device pertaining to the present invention will be explained using a camera as an example.

Figure 1:
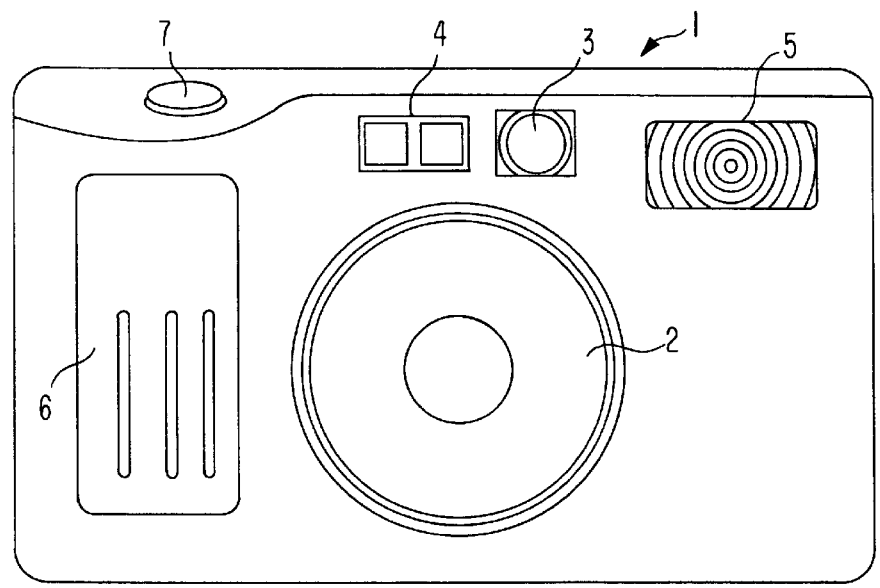
FIG. 1 is a front view of a first embodiment of the camera pertaining to the present invention.
Figure 2:
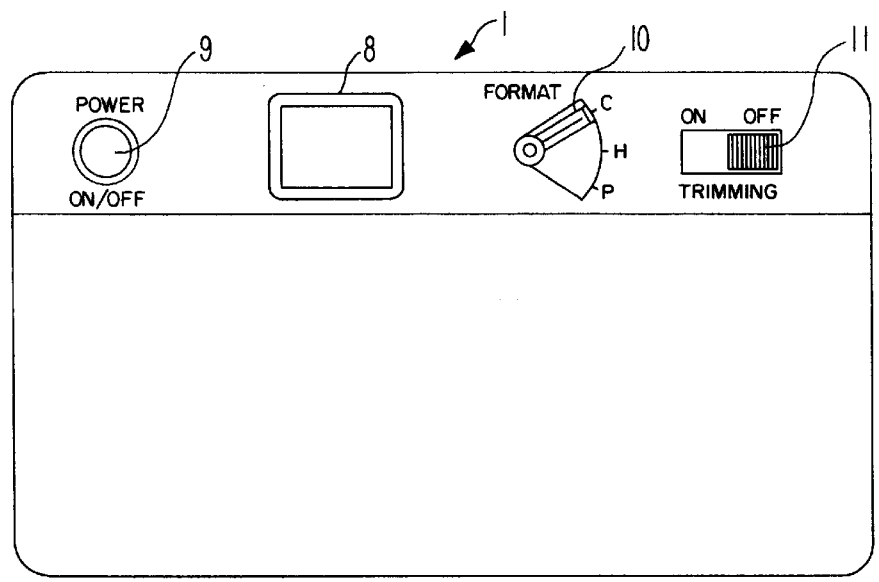
FIG. 2 is a rear view of the first embodiment of the camera pertaining to the present invention.

FIG. 1 is a front elevation view of a first embodiment of the camera pertaining to the present invention. FIG. 2 is a rear elevation view of the camera.

The camera 1 shown in FIG. 1 can use advanced photo system film. An image recording lens 2 is located essentially in the center of the front side of the body of the camera 1. An AF distance measuring unit 3 and a finder optical system 4 are located above this image recording lens 2. A built-in flash unit 5 is located in the upper right corner of the front side of the camera, and a shutter-release button 7 is located on the top surface of the grip 6 located on the front left side of the camera.

A finder window 8 is located at a position on the rear side of the body of the camera 1 such that it corresponds to the finder optical system 4, and a power supply switch 9 is located to its left. A format setting switch 10 for setting a print format, and a trimming setting switch 11 for setting a trimming magnification, are located to the right of the finder window 8, with the format setting switch 10 closest to the finder window 8.

The format setting switch 10 comprises a lever that is supported such that it can rotate up and down within a prescribed angular range. Exemplary setting points are indicated at the top, the middle and the bottom of the rotation range, corresponding to a "C" (standard) format, an "H" (high vision) format and a "P" (panorama) format, respectively. By setting the lever to one of the format positions, i.e., C, H or P, the print format that corresponds to that format position is set.

The trimming setting switch II comprises a two contact point sliding switch. By setting the switch to the ON side, a preset trimming magnification (n) (n=1.4, for example) is set. By setting it to the OFF side, the trimming adjustment setting is canceled (i.e., n is set to 1). The trimming magnification (n) can be set independently of the format setting switch 10, and the six different print format/trimming magnification combinations shown in Table 1 below are available for setting.

TABLE 1

| Trimming Magnification (n) | Print Format | | | | | |
|---|---|---|---|---|---|---|
| | H | | P | | C | |
| ×1.0 (OFF) | ○ | — | ○ | — | ○ | — |
| ×1.4 (ON) | — | ○ | — | ○ | — | ○ |

Figure 3:
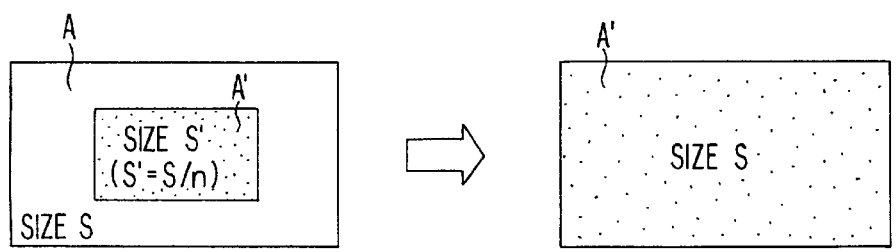
FIG. 3 is a drawing showing the relationship between a trimming area and a trimming magnification in trimming adjustment.

Trimming adjustment using a trimming magnification (n) refers to a process in which, when the captured image on the frame (hereinafter "the frame image") is reproduced on a display device such as a CRT or is printed, an image A' in the center of the frame having an area which is 1/n of the entire frame image area (hereinafter this area is termed "the print area") is enlarged by the magnification (n) (i.e., is enlarged to the size of the captured image A), as shown in FIG. 3, and is then printed or reproduced for display. In this embodiment, one trimming magnification is available, but it is also possible to provide two or more trimming magnifications.

The print format information and the trimming magnification (n) information (hereinafter collectively termed the "print information") set by means of the format setting switch 10 and the trimming setting switch 11 are optically recorded onto the film surface such that this information can be associated with each frame of the film.

With reference to FIG. 1, a cartridge bay in which a film cartridge used in the advanced photo system is located in the left end area in the body of the camera 1 seen from the front side (behind the grip), and a film take-up chamber is located below the built-in flash 5. A take-up spool that takes up the film fed out of the film cartridge is located in this film take-up chamber. The cartridge bay has an insertion opening at the bottom of the body of the camera 1. This insertion opening may be closed by means of a cover that is rotatably attached to the bottom of the body of the camera 1. A film cartridge is inserted into the film cartridge bay via the insertion opening by opening the cover.

Figure 4:
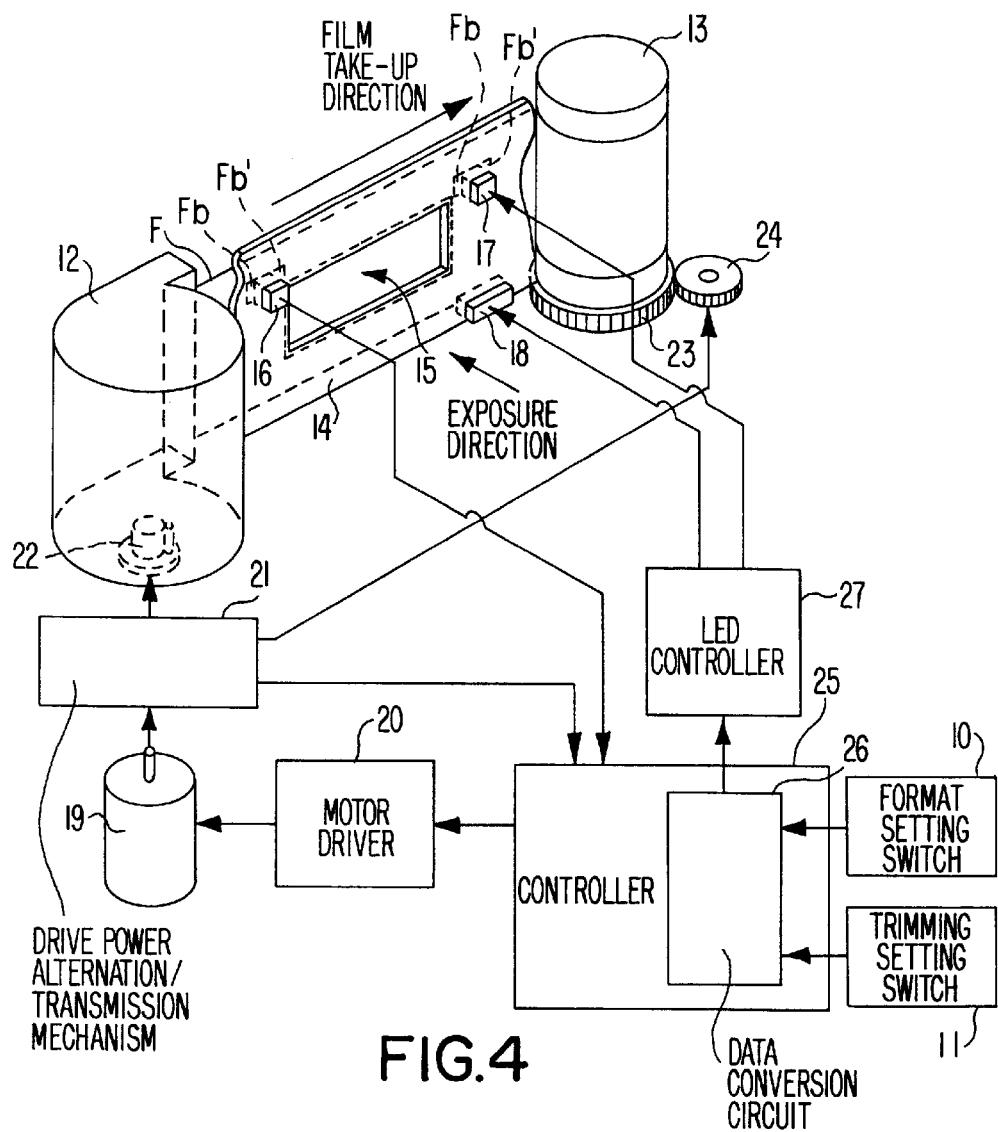
FIG. 4 is a drawing showing the basic construction of a film information writing device incorporated in a camera.

FIG. 4 shows the basic construction of one embodiment of the film information writing device mounted inside the camera 1.

The film information writing device shown in this drawing optically writes film information onto the film surface set by means of the format setting switch 10 and the trimming setting switch 11. It is also possible to magnetically write the film information onto the film surface or other part of the film.

In the drawing, the film cartridge 12 is housed inside the cartridge bay. Rolled film F is housed inside the film cartridge 12. The take-up spool 13 takes up the film F, and is located in the film take-up chamber of the camera 1. An exposure frame 14 is located between the cartridge bay and the film take-up chamber and behind the image recording lens 2. This exposure frame 14 comprises a guide plate for feeding the film F fed out of the film cartridge 12 to the film take-up chamber. It also has a rectangular exposure window 15 of prescribed dimensions (17 mm L×30 mm W, for example) essentially in its center and defines the size of the projected image of the photo object onto the film F.

The film F has multiple frames Fa along its length (see FIG. 4) and a pair of perforations Fb and Fb' for each frame Fa, which indicate the exposure area of that frame Fa, along one edge of the film (the upper edge in the drawing). The perforations Fb indicate the respective leading edges of the frames Fa in the direction of the winding of the film F, and the perforations Fb' indicate the trailing edges of the frames Fa. These perforations are formed at prescribed positions on either side of each frame Fa.

A photosensor 16 is located at a position near the top corner of the exposure window 15 of the exposure frame 14 on the side of the cartridge bay and facing the path of the perforations Fb and Fb', in order to detect the perforations Fb and Fb'. This photosensor 16 may be either a photointerrupter or a reflective photosensor. The detection signals from the photosensor 16 are input to a controller 25 described below and are used for the positioning of the exposure area of each frame Fa relative to the exposure window 15.

A photoemitter element 17 is located at a position near the top corner of the exposure window 15 of the exposure frame 14 on the side of the film take-up chamber and facing the area between a perforation Fb and a perforation Fb' when a frame Fa is positioned at the exposure position. A photoemitter element 18 is located near the bottom corner of the exposure window 15 of the exposure frame 14 on the side of the film take-up chamber. The photoemitter elements 17 and 18 optically write the film information onto the surface of the film F for each frame (by exposing the film F). Therefore, the photoemitter elements 17 and 18 function as exposure elements to write the film information onto the film F.

Figure 5:
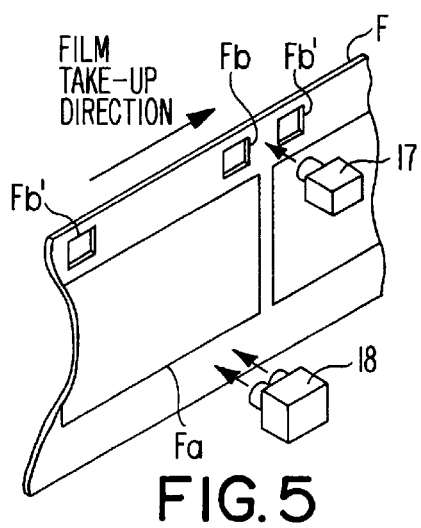
FIG. 5 is a perspective view of main components pertaining to the configuration of the photoemitter elements for film information writing and their location relative to the film.

In one embodiment, the photoemitter element 17 comprises one LED (light emitting diode), as shown in FIG. 5, and the photoemitter element 18 comprises an LED element formed by placing two LEDs together with a prescribed distance therebetween, such that they become one unit. The photoemitter elements 17 and 18 are not limited to LEDs, however. Other light sources (lamps, for example) may be used, so long as they are capable of exposing a part of the film F.

The film information is converted into data comprising three-bit signals, as described below. The photoemitter elements 17 and 18 convert each bit signal comprising the data into light energy and expose this information onto the film F. The composition of the data and the details of exposure achieved by each bit of the data are explained below.

The motor 19 provides a drive source to feed the film F. It comprises an electric motor such as a stepping motor, for example. The motor driver 20 controls the driving of this motor 19 (e.g., the direction of rotation, rotational speed, amount of rotation and starting/stopping). The motor driver 20 supplies power to the motor 19 and generates control signals (signals comprising pulse signals, for example) to control the rotation of the motor, and outputs the control signals to the motor 6.

The drive power alternation/transmission mechanism 21 alternately transmits the drive power of the motor 19 to the fork 22 that is inserted into the spool of the film cartridge 12 and to the drive gear 24 engaged with the gear 23 of the take-up spool 13. The drive power alternation/transmission mechanism 21 comprises a reduction/drive transmission unit comprising a combination of planetary gears (i.e., a gear train) and a drive direction alternation unit that alternates the connection of the gear train by means of a cam, such that the direction of transmission of the drive power of the motor 19 is alternated by changing the position of the cam. The camera 1 has the following drive power transmission modes: a take-up mode, a rewind mode and a thrust mode. In the take-up mode, the drive power of the motor 19 is transmitted to the drive gear 24 via the drive power alternation/transmission mechanism 21, and the film F is fed in the take-up direction due to the rotation of the take-up spool 13.

In the rewind mode, the drive power of the motor 19 is transmitted to the fork 22 via the drive power alternation/transmission mechanism 21, and the film F is fed in the rewinding direction due to the rotation of the spool of the film cartridge 12. In the thrust mode, film loading is performed. The drive power of the motor 19 is transmitted to the fork 22 and the drive gear 24 via the drive power alternation/transmission mechanism 21, and the film F is pushed out of the film cartridge 12 due to the rotation of the spool of the film cartridge 12. After the film is grasped by the take-up spool 13, the film F is fed in the take-up direction until the exposure area of the first frame Fa reaches the prescribed exposure position by means of the rotation of the spool of the film cartridge 12 and the take-up spool 13.

The controller 25 controls the feeding of the film F as well as the writing of the film information onto the film F, and comprises a microcomputer. The controller 25 outputs a cam alternation control signal to the drive power alternation/transmission mechanism 21 to control the film feeding mode. It also outputs a drive control signal to the motor driver 20 to control the drive of the motor 19. After image recording is performed for a frame Fa, the controller 25 moves the exposure area of the next frame Fa to the prescribed exposure position by controlling the timing for stopping of motor 16 based on the detection signals from the photosensor 16 regarding the perforations Fb and Fb'.

The controller 25 also has a data conversion circuit 26 that converts the print format information and the trimming magnification information input from the format setting switch 10 and the trimming setting switch 11 into three-bit data. The data generated by this data conversion circuit 26 is output to the LED light emission controller 27. The LED light emission controller 27 controls the light emission from the photoemitter elements 17 and 18 based on this data, so that the film information comprising the print format and the trimming magnification is optically written for each frame Fa of the film F.

The data conversion circuit 26 converts the print format information and trimming magnification information input from the format setting switch 10 and the trimming setting switch 11 into data comprising a prescribed bit pattern shown in Table 2 below, for example.

TABLE 2

| No. | Print Format | Trimming Magnification (n) | Data A | B | C |
|---|---|---|---|---|---|
| 1 | H | ×1.0 (OFF) | 0 | 0 | 0 |
| 2 | H | ×1.4 (ON) | 1 | 0 | 0 |
| 3 | P | ×1.0 (OFF) | 0 | 1 | 0 |
| 4 | P | ×1.4 (ON) | 1 | 1 | 0 |
| 5 | C | ×1.0 (OFF) | 0 | 1 | 1 |
| 6 | C | ×1.4 (ON) | 1 | 1 | 1 |

There are a total of six print format/trimming magnification combinations, i.e. film information items, and therefore, in Table 2, each item of film information is assigned to one of the six bit patterns for the three-bit data (A, B, C). The assignment of the bit patterns can be made in any manner desired. In the above-indicated embodiment, since there are two types of trimming information, as is clear from Table 2, a bit pattern in which the A bit is '1' is assigned to information items in which a trimming magnification is set. For items that share the same print format, the two-bit pattern of B and C is the same. In other words, the three-bit data is interpreted in such a manner that the data comprising the A bit indicates the set trimming magnification and the two B and C bits indicate the set print format information.

The A bit is used for the control of light emission from the photoemitter element 17 and the two B and C bits are used for the control of light emission from the photoemitter element 18, so that the identification bit for the setting of a trimming magnification is written between the perforations Fb and Fb' of two adjacent frames Fa and the bits assigned to indicate the print format are written onto the bottom edge area below each frame Fa of the film F. This is beneficial in order to meet the optical writing standard regarding the format information in the advanced photo system while making it possible to additionally write the trimming magnification information.

FIG. 6 is a drawing showing the No. 1 through No. 6 data of Table 2 written onto the film surface. FIGS. 6(a) through 6(c) of the drawing correspond to Nos. 1, 3 and 5, respectively, while FIGS. 6(d) through 6(f) correspond to Nos. 2, 4 and 6, respectively.

In FIG. 6, the area PA is an area of the image captured in the exposure area Fa that is to be printed or reproduced via the printing process or a display process in which the image is sent to a display device such as a CRT. The rectangular marks 28 through 30 indicate the positions at which the bits comprising the data, i.e., A, B and C, are written. The white rectangle indicates non-exposure (i.e., the writing of '0'), while a black rectangle indicates exposure (i.e., the writing of '1'). The letters in parentheses indicate the corresponding bits. It is also possible to reverse to correspondence between the bits '1' and '0', such that '0' represents black and '1' represents white.

Figure 6A:
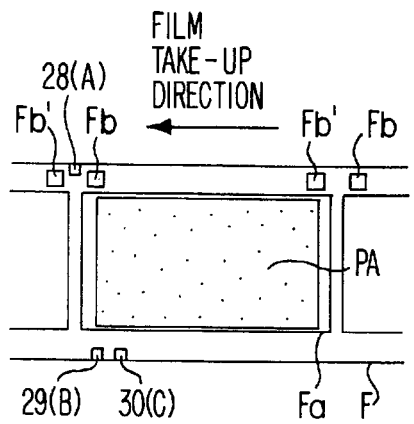
FIGS. 6(*a*)–6(*f*) (collectively referred to as FIG. 6) constitute a drawing showing the data of Table 2 (discussed below) written onto the film surface, wherein parts (a) through (c) show the data of Nos. 1, 3 and 5 written onto the film surface, and wherein parts (d) through (f) show the data of Nos. 2, 4 and 6 written onto the film surface.

In No. 1 in Table 2, as shown in FIG. 6(a), writing onto the film F is not performed, and the marks 28 through 30 remain unexposed. In this case, printing, etc., is performed using the H format without trimming adjustment, as in the case of regular developed film in which no trimming magnification is written. Therefore, the area PA in FIG. 6(a), which is the print area for the frame, accounts for the entire frame image.

Figure 6D:
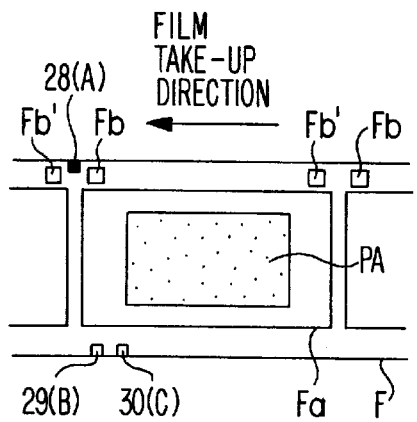
Figure 6B:
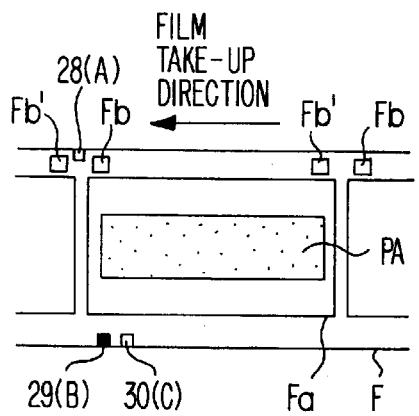
Figure 6E:
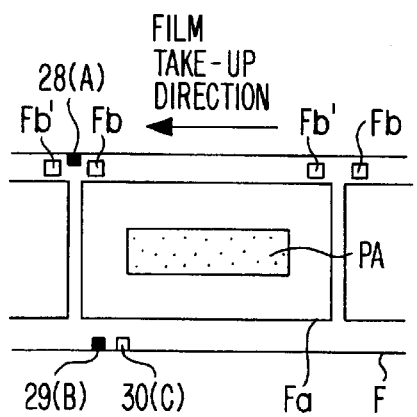
Figure 6C:
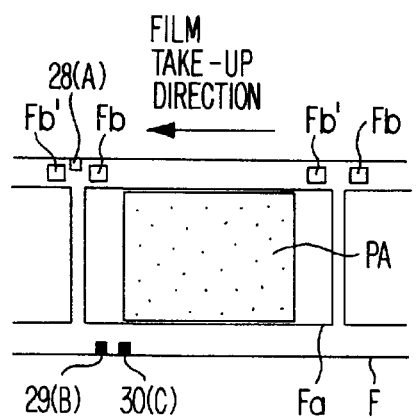
Figure 6F:
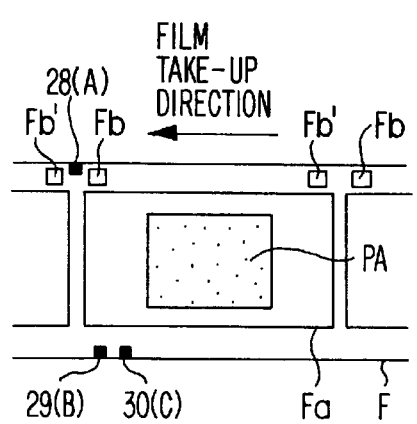

The area PA in FIG. 6(b) shows a P format print area in which printing, etc. is performed using the P format without trimming adjustment. The print area PA in FIG. 6(b) is of a size that is obtained by cutting 25% from both the top and bottom of the frame image relative to the print area PA shown in FIG. 6(a). The print area PA in FIG. 6(c) shows a C format print area in which printing, etc. is performed using the C format without trimming adjustment. The print area PA of FIG. 6(c) is of a size that is obtained by cutting the right and left sides of the frame image by approximately 12%, respectively. The areas PA in FIGS. 6(d) through 6(f) show the trimming areas in the H, P and C formats, respectively, and each trimming area is printed after undergoing ×1.4 trimming adjustment. Therefore, these areas are approximately 72% (=(100/1.4)%) of the center area of the frame image relative to the print areas PA of FIGS. 6(a) through 6(c), respectively.

In this construction, when the user operates the format setting switch 10 and the trimming setting switch 11 during image recording to set a desired print format and trimming magnification and operates the shutter-release button 7 to instruct shutter release, a series of image recording operations is started, such as light measurement, distance measurement, AF control, and exposure of the object image onto the exposure area Fa, and at the same time, the print format information and trimming magnification information are input to the controller 25. The information is then converted into three-bit data in the data conversion circuit 26 and output to the LED light emitting controller 27. The LED light emitting controller 27 causes the photoemitter elements 17 and 18 to emit light at a prescribed time during the series of image recording processes (at the same time that the exposure takes place or after the exposure is completed, for example), and the data is optically written onto the film F at the prescribed areas (see the positions of the marks 28 through 30 in FIG. 6).

Figure 7:
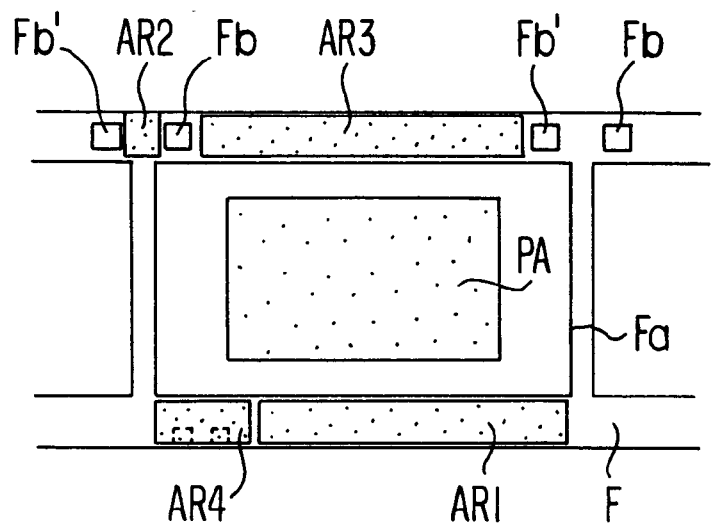
FIG. 7 shows a drawing indicating areas at which the trimming information may be written.

With reference to FIG. 7, in this embodiment, the writing position for the mark 28 is in the area AR2 between the perforation Fb indicating the trailing end of one frame Fa and the perforation Fb' indicating the leading end of another frame Fa adjacent to the previous frame. This is because if the writing position were in the area AR3 between the perforations Fb and Fb' for the same frame Fa, it could be confused with other information recorded in the area AR3 as a latent image or misread. Alternatively, if it were in the area AR1 next to the area AR4 in the bottom edge area of the film F at which the marks 29 and 30 are recorded, it could be confused with these marks 29 and 30 or misread. The mark 28 is therefore in the area AR2 in order to prevent such confusion or misreading and increase the reliability of reading and writing of the film information.

Figure 8:
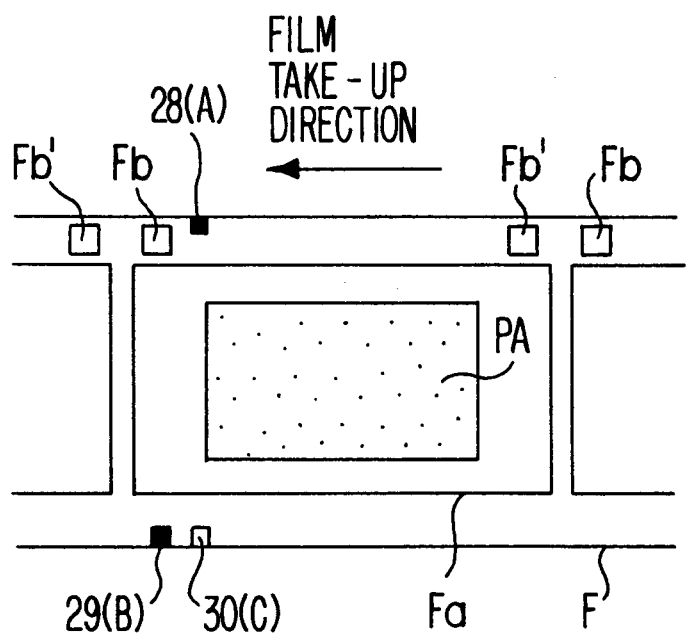
FIG. 8 is a drawing showing one example in which the trimming magnification data is written between the pair of perforations for the same frame.
Figure 9A:
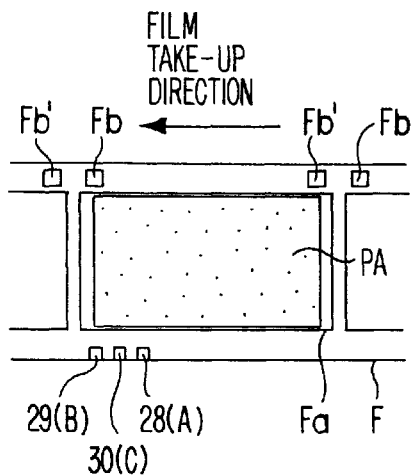
FIGS. 9(*a*)–9(*f*) (collectively referred to as FIG. 9) constitute a drawing showing one example in which the trimming magnification data writing area located on the top edge area of the film in FIG. 6 is moved to the bottom edge area of the film.
Figure 9D:
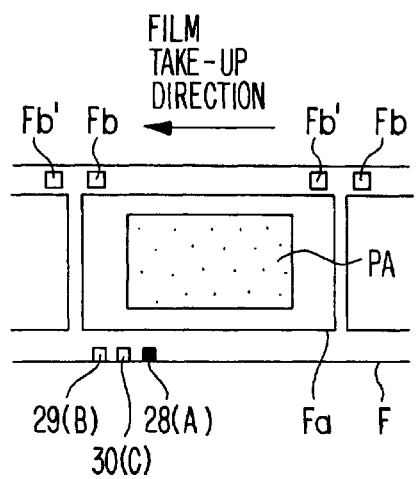
Figure 9B:
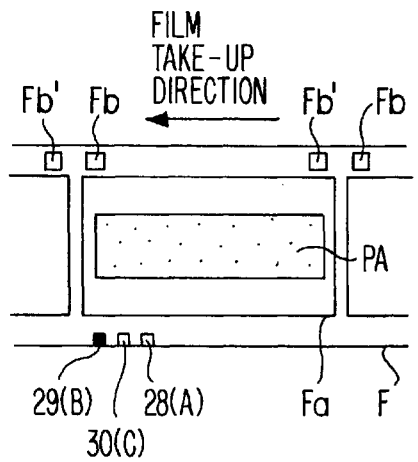
Figure 9E:
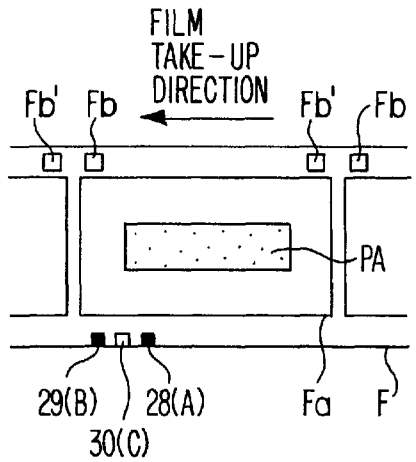
Figure 9C:
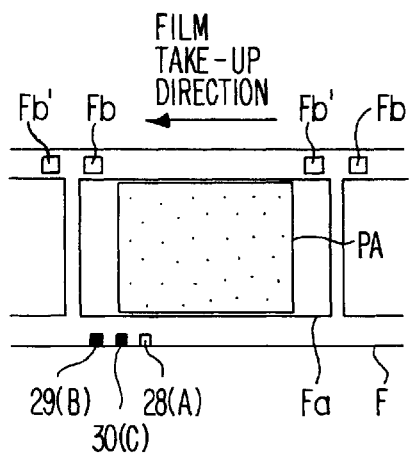
Figure 9F:
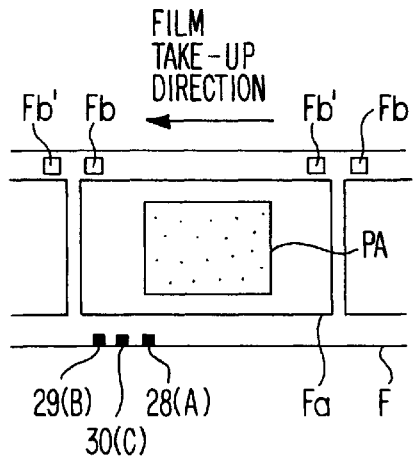
Figure 10A:
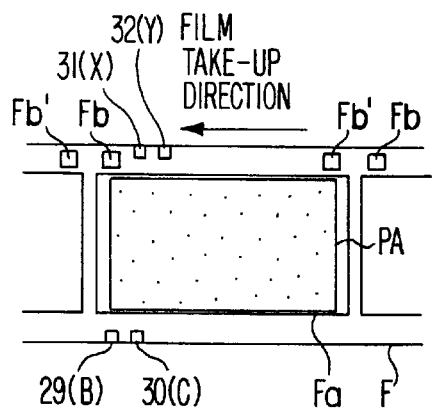
FIGS. 10(*a*)–10(*f*) (collectively referred to as FIG. 10) constitute a drawing showing the data of Table 3 (discussed below) written onto the film surface, wherein FIGS. 10(*a*) through 10(*c*) show the data of Nos. 1, 3 and 5 written onto the film surface, and FIGS. 10(*d*) through 10(*f*) show the data of Nos. 2, 4 and 6 written onto the film surface.
Figure 10D:
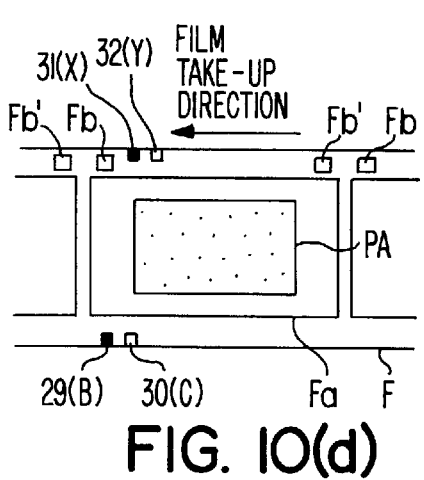
Figure 10B:
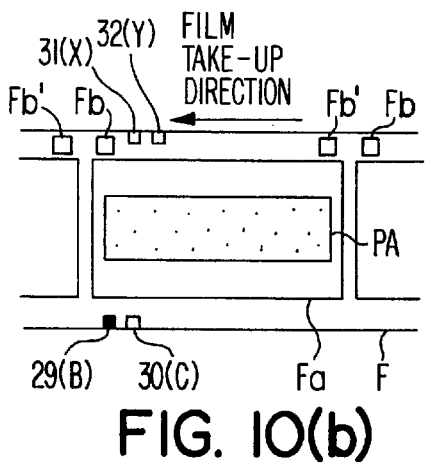
Figure 10E:
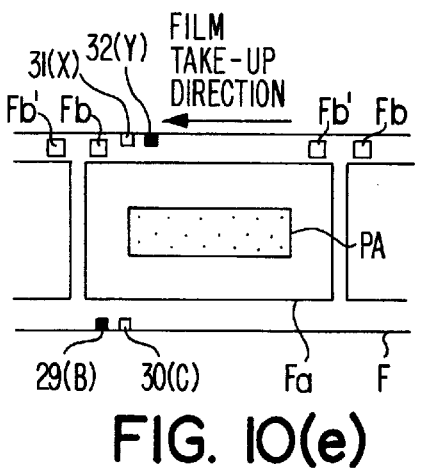
Figure 10C:
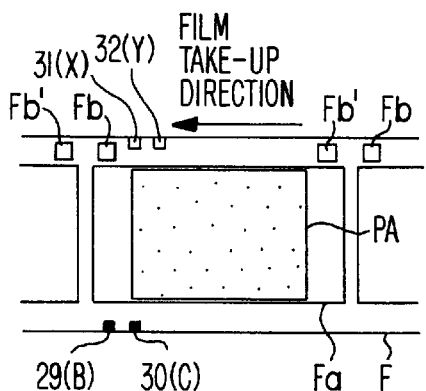
Figure 10F:
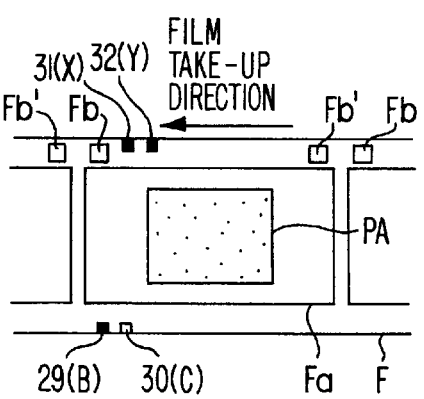

In alternative embodiments, as shown in FIG. 8, the writing position for the mark 28 may be located in the area AR3 between the perforation Fb indicating the leading end of a frame Fa and the perforation Fb' indicating its trailing end. It is also possible that the writing position for the mark 28 is located in the area ARI that is next to the mark 30, as shown in FIG. 9. Using the writing method in FIG. 9, the three marks 28 through 30 are aligned in a row, which makes the photoemitter element 17 unnecessary, allowing the number of photoemitter elements to be reduced.

Further, in this embodiment, the A bit, which is the identification bit for the trimming magnification information, is additionally written in the top edge area of the film F, to make the optical writing method compatible with the writing of the print format in the advanced photo system, but the same effect can be obtained if two marks 31 and 32 are written in the top edge area of the film F in place of the mark 28, as shown in FIG. 10.

In the film information writing method shown in FIG. 10, the B bit (or the C bit) that comprise a part of the print format information is used as the identification bit for the trimming information. Therefore, if the bits corresponding to the marks 31 and 32 are the X bit and Y bit, respectively, where no trimming magnification is set, the three print formats may be identified based on the two B and C bits, and where a trimming magnification is set, the three print formats may be identified using the two X and Y bits.

Therefore, where no trimming information is set in this embodiment, compatibility with the optical writing method for the writing of the print format information in the advanced photo system may be maintained as well. The bit composition of the data corresponding to FIG. 10 is shown in Table 3 below.

TABLE 3

| No. | Print Format | Trimming Magnification (n) | B | C | X | Y |
|---|---|---|---|---|---|---|
| 1 | H | ×1.0 (OFF) | 0 | 0 | 0 | 0 |
| 2 | H | ×1.4 (ON) | 1 | 0 | 1 | 0 |
| 3 | P | ×1.0 (OFF) | 1 | 0 | 0 | 0 |
| 4 | P | ×1.4 (ON) | 1 | 0 | 0 | 1 |
| 5 | C | ×1.0 (OFF) | 1 | 1 | 0 | 0 |
| 6 | C | ×1.4 (ON) | 1 | 0 | 1 | 1 |

Incidentally, in this embodiment, only one trimming magnification is available. Therefore, setting the trimming setting switch 11 to 'ON' means that a trimming magnification (n) is set, as well as that trimming adjustment is to be performed. Consequently, the explanation provided above assumed that the writing position for the trimming information was the same as the writing position for the identification bit regarding whether trimming adjustment is to be performed, but where two or more trimming magnifications (n) are available, which is generally the case, data comprising the trimming magnification (n) may be written by using two or more bits.

Figure 11:
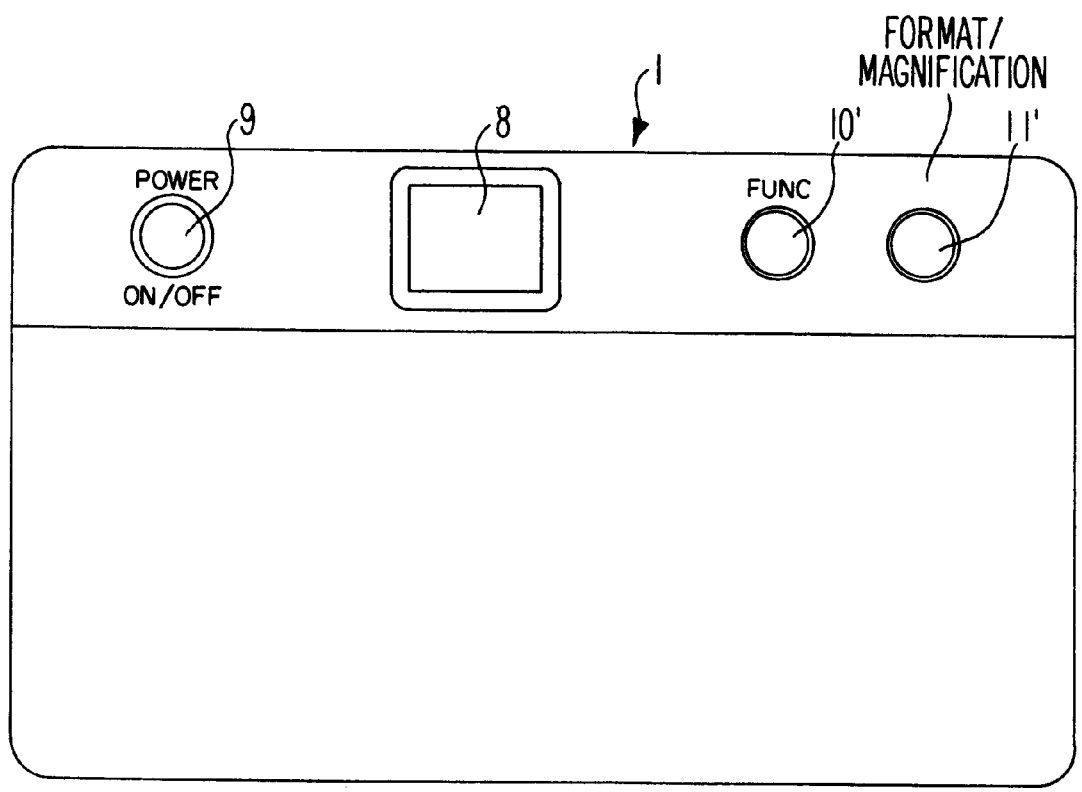
FIG. 11 is a drawing in which the print format setting switch and the trimming setting switch in FIG. 2 are replaced with a function switch and a selection switch, respectively.
Figure 12:
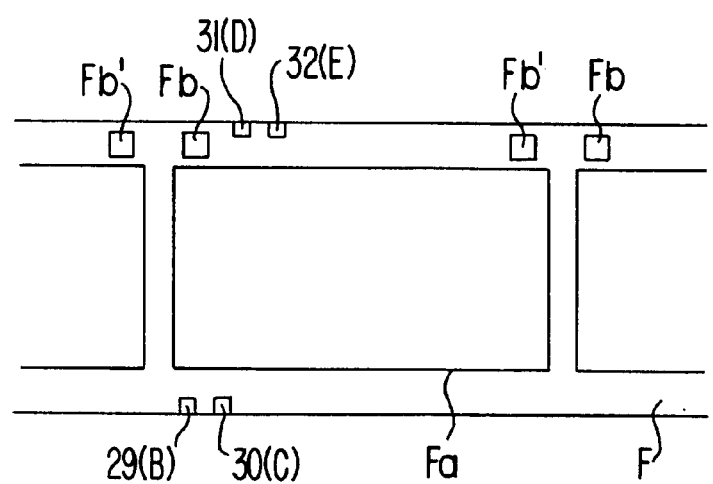
FIG. 12 is a drawing showing an example in which the trimming magnification data comprising a two-bit pattern is written onto the area AR3 of the film.

In this case, as shown in FIG. 11, the print format setting member and the trimming magnification setting member comprise a function switch 10' consisting of (i) a two contact point switch to switch the setting mode, and (ii) a selection switch 11', which comprises a momentary switch to select and set a format or a trimming magnification. These switches should also be constructed such that (i) the format setting mode and the trimming magnification setting mode are alternately displayed on the display unit not shown in the drawing, and (ii) multiple preset formats or trimming magnifications are displayed in a cyclical fashion, such that when the print format setting mode is present, the display shows C, then H, then P, then returns to C, and when the trimming magnification setting mode is present, the display shows 1.0, 1.4, etc., in sequence, and then returns to 1.0.

The user can set a desired mode by operating the function switch 10' to have the format setting mode or the trimming magnification setting mode displayed on the display unit, and can set a desired print format or trimming magnification by operating the selection switch 11' to show any of the formats or magnifications corresponding to the mode displayed on the display unit.

Table 4 shows examples of print format/trimming information combinations that may be set when the trimming magnification (n) information comprises the two bits of D and E.

As is clear from Table 4, (D, E)=(0, 0) means "no trimming adjustment" and (D, E)=(1, 0) means that the trimming magnification (n) is ×1.4. (D, E)=(0, 1) means that the trimming magnification (n) is ×2.0 and (D, E)=(1, 1) means that the trimming magnification (n) is ×2.8.

In the data bit composition shown in Table 4, two marks 31 and 32 are written in the area AR3 of the film F, and the control of the writing regarding the marks 31 and 32 is performed based on the D and E bit data, respectively. The marks 31 and 32 may be written in the area AR1, or in the areas AR2 and AR3 separately.

TABLE 4

| No. | Print Format | Trimming Magnification (n) | B | C | D | E |
|---|---|---|---|---|---|---|
| 1 | H | ×1.0 (OFF) | 0 | 0 | 0 | 0 |
| 2 | H | ×1.4 | 0 | 0 | 1 | 0 |
| 3 | H | ×2.0 | 0 | 0 | 0 | 1 |
| 4 | H | ×2.8 | 0 | 0 | 1 | 1 |
| 5 | P | ×1.0 (OFF) | 1 | 0 | 0 | 0 |
| 6 | P | ×1.4 | 1 | 0 | 1 | 0 |
| 7 | P | ×2.0 | 1 | 0 | 0 | 1 |
| 8 | P | ×2.8 | 1 | 0 | 1 | 1 |
| 9 | C | ×1.0 (OFF) | 1 | 1 | 0 | 0 |
| 10 | C | ×1.4 | 1 | 1 | 1 | 0 |
| 11 | C | ×2.0 | 1 | 1 | 0 | 1 |
| 12 | C | ×2.8 | 1 | 1 | 1 | 1 |

In the example shown in Table 4, four trimming magnifications (n) (including (n)=1.0) are available for each format, using all of the bit patterns of the D and E bits. Where the trimming magnification (n) is large, however, deterioration in image quality due to enlargement becomes noticeable, and consequently large trimming magnifications (n) will not be used as a practical matter. Therefore, the available maximum value of the trimming magnification (n) may be limited to ×2. In other words, in Table 4, those cases in which (n)=28 (No. 4, 8 and 12) may be excluded.

Figure 13I:
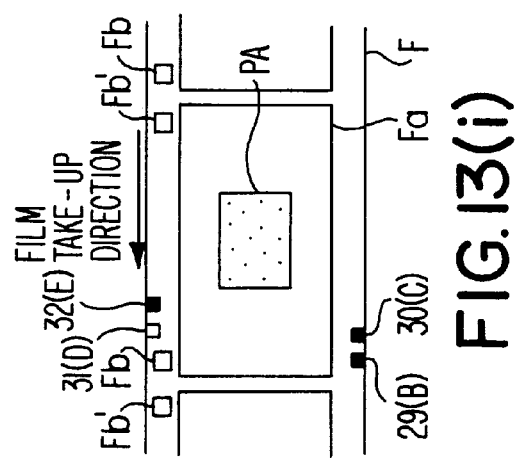
Figure 13H:
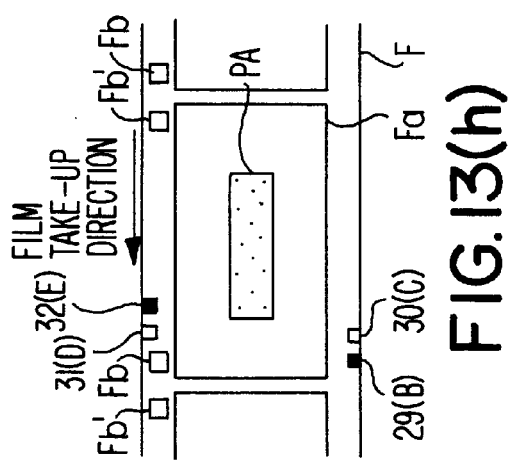
Figure 13G:
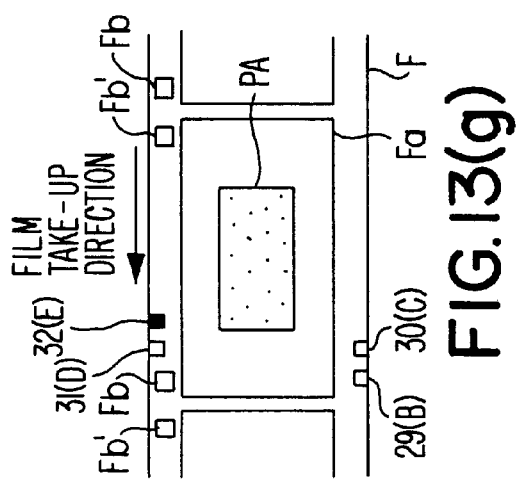

FIG. 13 shows the writing positions for the writing of the print information onto the film F when the available maximum trimming magnification (N) is ×2.0. In FIG. 13, the data corresponding to the print magnification (n) is written in the area AR3 of the film F. FIGS. 13(a) through 13(c) correspond to Nos. 1, 5 and 9 of Table 3, FIGS. 13(d) through 13(f) correspond to Nos. 2, 6 and 10 of Table 4, and FIGS. 13(g) through 13(i) correspond to Nos. 3, 7 and 11 of Table 4, respectively.

In the bit composition shown in Table 4, the B and C bits are assigned to the data comprising the print format information to provide compatibility with the optical writing method for writing the print format in the advanced photo system, but if this compatibility is not required for a particular application, multiple items of film information comprising print format information and trimming magnification information may be indicated using all of the four bits, wherein the B, C, D and E bit patterns would be assigned to each print format/trimming magnification combination in an appropriate fashion.

Where the print format information and the trimming magnification (n) information are each indicated using two-bit data, as described above, if the number Kp of selectable print formats and the number Kt of selectable trimming magnifications (n) (including (n)=1.0) are smaller than the number K that may be identified using two-bit data (=4), there will be unused bit patterns. In addition, in the situation where the trimming magnifications (n) are limited to values equal to or below a certain magnification from the standpoint of deterioration in image quality due to enlargement, there will be unused bit patterns as well.

The film information handling method where the film information comprises three-bit data or four-bit data was explained in the embodiment described above from the standpoint of the writing positions for the writing onto the film F. The film information handling method will now be explained below from the standpoint of effective use of the unused bit patterns.

The method in which the number of selectable trimming magnifications (n) is increased using unused bit patterns will first be explained.

Where the print information is expressed using four-bit data, it is possible to identify 16 (i.e., 24) items of print information. This is the number of possible identifications when the four-bit data is simply assigned to the print information without dividing the bits between the print format information and the trimming magnification information.

However, print information comprises print format information and trimming magnification (n) information (including (n)=1.0), as described above. Moreover, the writing position for writing of the print format information onto the film F is predetermined by the advanced photo system. Thus, if the compatibility with the advanced photo system in terms of the writing position for the print information onto the film F is considered, the conclusion is that print information data comprises one two-bit data item expressing the print format and another two-bit data item expressing the trimming magnification (n).

As a result, only four different magnifications (n) comprising two-bit data are available for each print format. Consequently, the number of available trimming magnifications (n) is reduced to 12 (3×4). If the number of bits that comprises the trimming magnification (n) data is increased to three or more, the number of available trimming magnifications (n) may be easily increased, but simply increasing the number of bits of the trimming magnification (n) data without effectively using the unused B and C bit patterns that would have been ordinarily used to indicate a print format would increase the number of photoemitter elements for exposure and thereby give rise to a cost disadvantage.

Therefore, in this embodiment, unused B and C bit patterns that are not used to indicate a print format are used to indicate supplementary information regarding the trimming magnifications (n).

If a trimming magnification (n) is expressed by means of a combination of the B and C bit pattern (0, 1) not used to indicate a print format, as well as by means of a D and E bit pattern, there will be two types of data compositions that will indicate a trimming magnification (n), i.e., there will be data comprising D and E bits and data comprising (B=0, C=1) and the D and E bits. The trimming magnification (n) data comprising (B=0, C=1) and the D and E bits does not include print format information. Therefore, in this embodiment, additional trimming magnifications are added to the trimming magnifications expressed by the regular trimming magnification (n) bits, i.e., the D and E bits, for one of the C, H and P print formats, such that data comprising (0, 1, D, E) is assigned to the additional trimming magnifications (n). In other words, four items of trimming magnification (n) data comprising (0, 1, D, E) are added to the C, H or P print format in Table 4 shown above.

In the example of Table 4, the regular selectable trimming magnifications (n) are set such that they comprise a geometrical progression having a common ratio of approximately 1.4:1, and therefore, it is possible to set the additional trimming magnifications such that they also comprise a geometrical progression. However, considering the deterioration in image quality resulting from enlargement, setting an excessively large trimming magnification (n) would not be practical.

Consequently, in this embodiment, the regular trimming magnifications (n) in the example of Table 4 are used as the standard magnifications (nr), and the number of selectable trimming magnifications (n) is increased by multiplying these standard magnifications (nr) by a prescribed coefficient (k). Therefore, this method is similar to the method in which the number of selectable trimming magnifications is increased within a prescribed range by making the common ratio of the standard magnifications (nr), which comprise a geometrical progression, small.

Table 5 below shows selectable trimming magnifications (n) when (k)=1.2. In this table, the asterisk indicates that the standard magnification is not multiplied by the coefficient (k). Trimming magnifications (n) that are expressed as (n)=(k)×(nr) are the additional magnifications in this table. It is also possible to consider that the coefficient (k) is 1.0 for the areas marked with an asterisk.

TABLE 5

| n | nr | k |
| --- | --- | --- |
| 1.0 | 1.0 | * |
| 1.2 | 1.0 | 1.2 |
| 1.4 | 1.4 | * |
| 1.68 | 1.4 | 1.2 |
| 2.0 | 2.0 | * |
| 2.4 | 2.0 | 1.2 |
| 2.8 | 2.8 | * |

Figure 14:
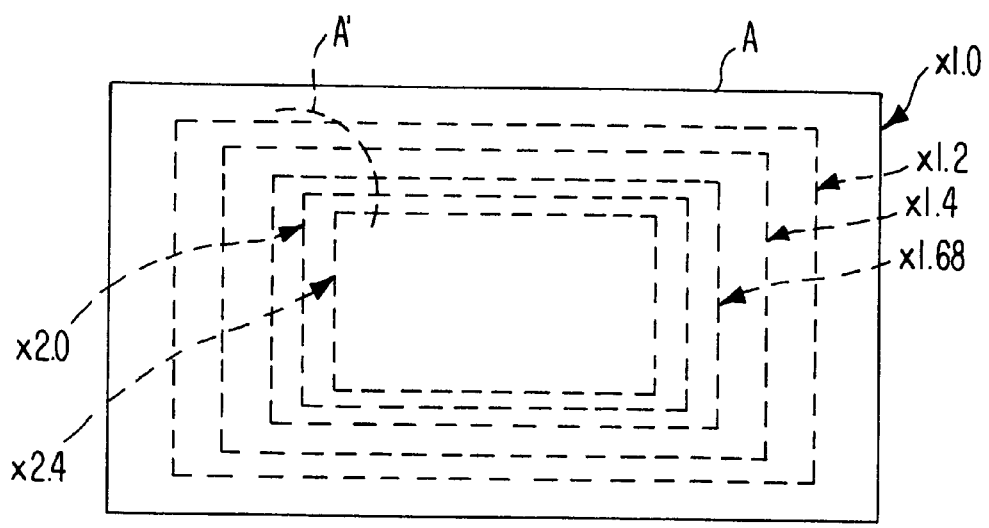
FIG. 14 is a drawing showing the relationship between a trimming magnification and a trimming area in the H format.

Table 6 below shows the data bit composition when the number of selectable trimming magnifications (n) for the H format is increased in the same way as in Table 5 shown above. If the maximum selectable trimming magnification (N) is made unnecessarily large, the resulting deterioration in image quality would be noticeable, and such a magnification would therefore not be selected as a practical matter. Taking this into consideration, the number of selectable trimming magnifications (n) is increased within the range of effective use (n=2.5 or smaller, for example) in Table 6. Consequently, in Table 6, Nos. 4, 8 and 12 of Table 4 are excluded, and trimming magnifications (n) (n=1.2, 1.68 and 2.4) (see the shaded areas) are added. In the example of Table 6, therefore, the trimming process may be performed on any of the five trimming areas A' inside the frame image A, as shown in FIG. 14.

As shown in Table 6, the additional trimming magnification (n) data comprises the D and E bits that indicate the standard magnification (nr), and the B and C bits that are not used to indicate a print format, i.e., (0, 1), are used as the equivalent of the coefficient (k). As a result, by simply changing the specific value that is defined as the coefficient (k) (<2), six trimming magnifications (n) having a prescribed bit pattern in the range of 1.0×(n)<3 may be easily set. Furthermore, by changing the coefficient (k) and the standard magnifications (nr) appropriately, the trimming magnifications (n) may be made to comprise a geometrical progression having a certain common ratio (<2).

TABLE 6

| No. | Print Format | Trimming Magnification (n) | B | C | D | E |
|---|---|---|---|---|---|---|
| 1 | H | ×1.0 (OFF) | 0 | 0 | 0 | 0 |
| 2 | H | ×1.2 | 0 | 1 | 0 | 0 |
| 3 | H | ×1.4 | 0 | 0 | 1 | 0 |
| 4 | H | ×1.68 | 0 | 1 | 1 | 0 |
| 5 | H | ×2.0 | 0 | 0 | 0 | 1 |
| 6 | H | ×2.4 | 0 | 1 | 0 | 1 |
| 7 | P | ×1.0 (OFF) | 1 | 0 | 0 | 0 |
| 8 | P | ×1.4 | 1 | 0 | 1 | 0 |
| 9 | P | ×2.0 | 1 | 0 | 0 | 1 |
| 10 | C | ×1.0 (OFF) | 1 | 1 | 0 | 0 |
| 11 | C | ×1.4 | 1 | 1 | 1 | 0 |
| 12 | C | ×2.0 | 1 | 1 | 0 | 1 |

In the example of Table 6, using the construction of the camera 1 shown in FIG. 11, when the trimming magnification setting mode is set after the H format is set by means of the function switch 10' and the selection switch 11', the value of the trimming magnification (n) displayed cyclically changes each time the selection switch 11' is pressed, showing one of the six possible choices in the order of 1.0, 1.2, 1.4 . . . 2.4, and then back to 1.0. By selecting any desired magnification (n), that trimming magnification (n) may be set. On the other hand, where the C format or the P format is set, the three possible choices for the value of the trimming magnification (n) are cyclically displayed one by one in the order of 1.0, 1.4, 2.0, and then back to 1.0, and any desired trimming magnification (n) may be set from among them.

If (B, C, D, E)=(0, 1, D, E) is added as selectable trimming magnifications (n) in the C format or the P format, the number of trimming magnification (n) choices may be increased in these formats.

The method in which multiple different trimming areas may be made selectable using the same trimming magnification (n) by means of unused bit patterns will now be explained.

Figure 15:
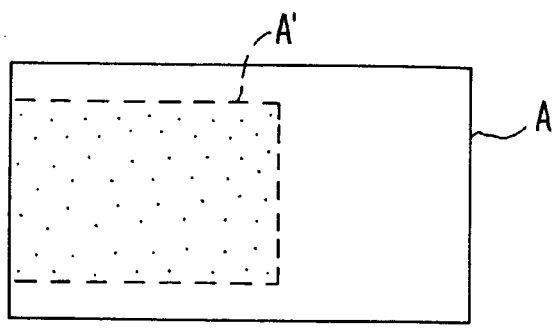
FIG. 15 is a drawing in which the trimming area is located on the left end area of the frame image in the C format.
Figure 16:
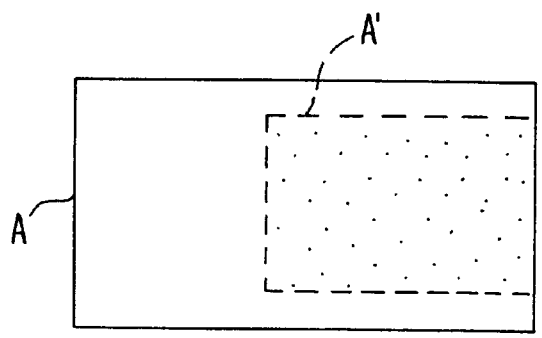
FIG. 16 is a drawing in which the trimming area is located on the right end area of the frame image in the C format.

FIG. 15 shows the trimming area A' when the trimming magnification (n) is ×1.4 in the C format, where the area A' is the left end area of the frame image A. FIG. 16 shows the trimming area A' when the trimming magnification (n) is ×1.4 in the C format, where the area A' is the right end area of the frame image A.

In Tables 5 and 6, the number of selectable trimming magnifications (n) was increased using the unused bit patterns in the example of Table 4. By assigning a specific trimming magnification (n) having a trimming area other than the center of the frame image, as shown in FIGS. 15 and 16, to the unused bit pattern, it is possible to make multiple trimming areas selectable for said trimming magnification.

In the example of Table 4, the (0, 1) pattern is unused for the B and C bits and the (1, 1) pattern is unused for the D and E bits if the maximum trimming magnification (N) is limited to ×2, and therefore, in terms of four-bit patterns using the B, C, D and E bits, a total of eight bit patterns, i.e., four bit patterns for (0, 1, D, E) and four bit patterns for (B, C, 1, 1), are unused.

Table 7 shows one example in which the unused (B, C, D, E) bit patterns are assigned to the data for a trimming magnification (n) that has a trimming area at the right and left end areas of the frame image. As shown in this table, while the trimming magnification (n) for which multiple trimming areas may be selected is ×1.4, it is also acceptable if multiple trimming areas are made selectable for other trimming magnifications (n).

TABLE 7

| Data | | | | Print Information | | |
|---|---|---|---|---|---|---|
| B | C | D | E | Format | Trimming Magnification | Area |
| 0 | 0 | 1 | 1 | H | ×1.4 | Right |
| 1 | 0 | 1 | 1 | P | ×1.4 | Right |
| 0 | 1 | 1 | 1 | | | |
| 1 | 1 | 1 | 1 | C | ×1.4 | Right |
| 0 | 1 | 0 | 0 | H | ×1.4 | Left |
| 0 | 1 | 1 | 0 | P | ×1.4 | Left |
| 0 | 1 | 0 | 1 | | | |
| 0 | 1 | 1 | 1 | C | ×1.4 | Left |

In Table 7, "right" under "area" means that the trimming area A' in the frame image A is the right end area (see FIG. 16) and "left" under "area" means that the trimming area A' in the frame image A is the left end area (see FIG. 15). The bit patterns that correspond to "—" means they are not used.

The selection of a trimming area may be enabled by, if the construction of the camera 1 shown in FIG. 11 is used, having the contents of selection for the trimming magnification by means of the selection switch 11' to be 1.0, 1.4 (center), 1.4 (left), 1.4 (right), 2.0, for example. But it is also acceptable if a two contact point slide switch is added to change and set the trimming area to the left end area or the right end area.

In Table 7, the unused bit patterns (1, 1, 1, 1) and (0, 1, 0, 1) may be assigned to the left and right trimming areas for the magnification (n)=2.0 in the C format, for example, such that the number of trimming area choices in the C format is larger than in the other formats.

Figure 17:
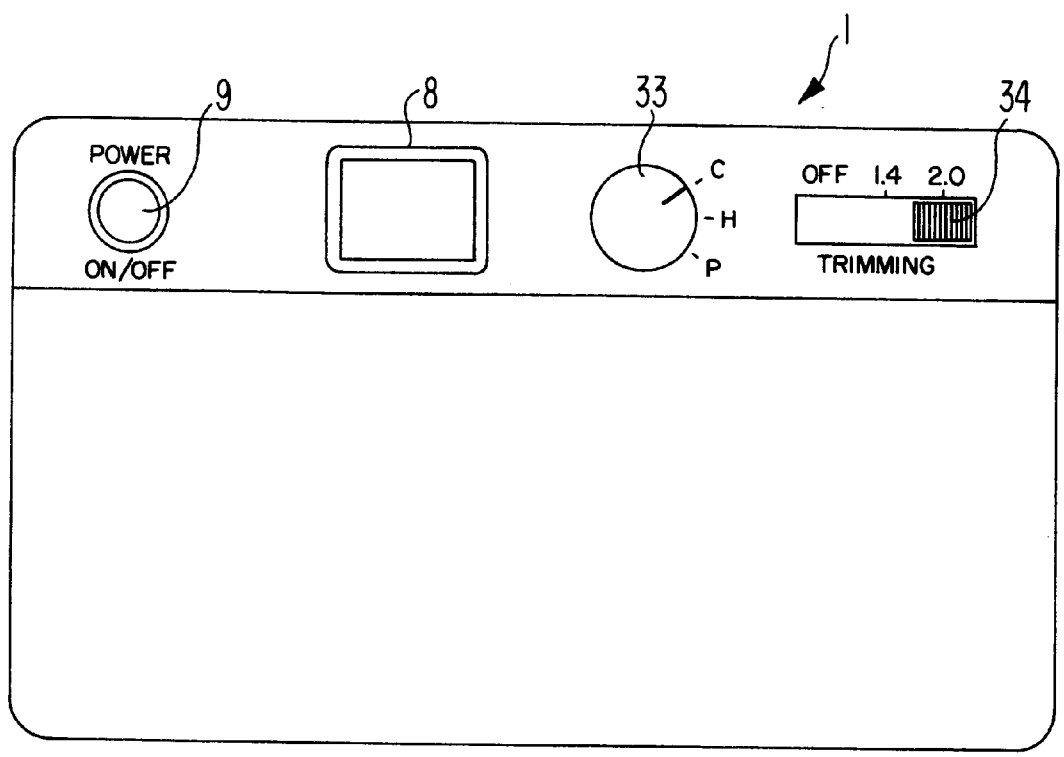
FIG. 17 is a rear view of a second embodiment of the camera pertaining to the present invention.

FIG. 17 is a rear elevation of a second embodiment of the camera pertaining to the present invention.

In the first embodiment, three print formats and two or more trimming magnifications (n) (including (n)=1.0) may be set independently of each other. In the second embodiment, three trimming magnifications (n) (including (n)=1) are set in tandem with each print format. A trimming magnification (n) may be set in tandem with a print format in this way because some of the print format/trimming magnification (n) combinations do not allow the effect of trimming adjustment to be fully realized because of deterioration in image quality due to enlargement. Moreover, the maximum trimming magnification (N) varies from one print format to another. The ease of operation in the setting of a print format and a trimming magnification is increased in the second embodiment by eliminating selection of such combinations.

FIG. 17 is identical to FIG. 2 except for that (i) the format setting switch 10 comprising a lever is replaced with a format setting switch 33 comprising a round button and (ii) the trimming setting switch 11 comprising a two contact point slide switch is replaced with a trimming setting switch 34 comprising a three contact point slide switch.

The format setting switch 10 and the format setting switch 33 are different from each other in terms of the configuration of the operation member only, and they have the same electric switching function. The trimming setting switch 11 and the trimming setting switch 34 are also different in the number of contact points only, and they have the same electric switching function.

In this embodiment, because selection can be made from among preset trimming magnifications in tandem with the print format, while the trimming setting switch 34 may be physically operated independently of the format setting switch 33, the trimming information input from the trimming setting switch 34 is deemed valid by the controller 25 only in the checked cases in Table 8 below, for example. It is also envisioned that the trimming setting switch 34 can be made operable such that it is mechanically subject to the format setting switch 33.

TABLE 8

|  | Trimming Magnification (n) | | |
| --- | --- | --- | --- |
| Print Format | ×1.0(OFF) | ×1.4 | ×2.0 |
| H | ○ | ○ | |
| P | ○ | | |
| C | ○ | ○ | ○ |

In Table 8, trimming adjustment is prohibited in the P format because the effect of trimming adjustment in which only the center part of the image is enlarged and printed is not fully realized due to the fact that the objects are spaced widely apart in the short and wide screen used in panorama image recording. In addition, the trimming magnification (n) cannot be set to be ×2 or larger in the H format because there will be little effective use of the trimming adjustment due to the deterioration in image quality caused by enlargement.

The film information comprising a print format/trimming magnification combination shown in Table 8 is converted by the data conversion circuit 26 into four-bit data shown in Table 9 below, for example.

TABLE 9

|  |  | Trimming | Data | | |
| --- | --- | --- | --- | --- | --- |
| No. | Print format | Magnification (n) | A | B | C |
| 1 | H | ×1.0 (OFF) | 0 | 0 | 0 |
| 2 | H | ×1.4 | 1 | 0 | 0 |
| 3 | P | ×1.0 (OFF) | 0 | 1 | 0 |
| 4 | C | ×1.0 (OFF) | 0 | 1 | 1 |
| 5 | C | ×1.4 | 1 | 1 | 1 |
| 6 | C | ×2.0 | 1 | 1 | 0 |

Figure 18:
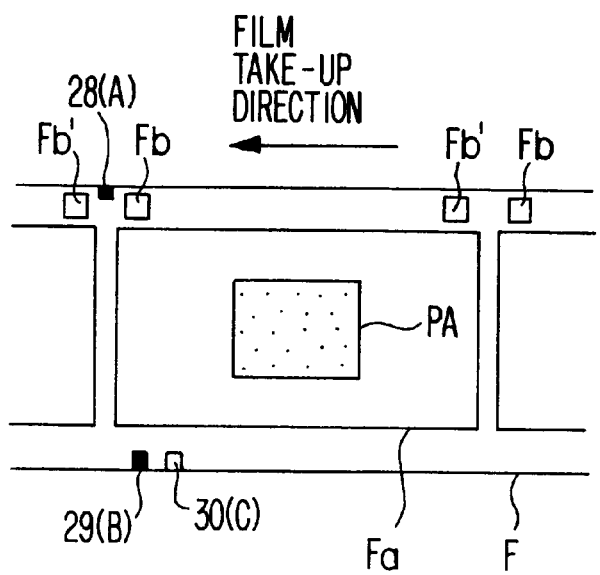
FIG. 18 is a drawing showing the data of No. 6 in Table 9 written onto the film surface.

In Table 9, the No. 4 bit pattern in Table 2 is assigned to trimming adjustment using a ×2.0 magnification in the C format (No. 6 in Table 9). Therefore, the manner of writing data in correspondence to Table 9 will be the same as in FIG. 6 except that FIG. 6(e) is changed to reflect the situation shown in FIG. 18. As shown in FIGS. 8 through 10, it is envisioned that the A bit can be written in areas AR1 or AR3 of the film F.

In Table 10, the number of selectable trimming magnifications (n) is increased from the example of Table 8, where the maximum trimming magnification (Nh) in the H format in Table 4 is limited to ×2.0 and the maximum trimming magnification (Np) in the P format is limited to ×1.4. Accordingly, the (B, C, D, E)=(0, 0, 1, 1), (1, 0, 0, 1) and (1, 0, 1, 1) bit patterns are not used in Table 10.

TABLE 10

|  |  | Trimming | Data | | | |
| --- | --- | --- | --- | --- | --- | --- |
| No. | Print Format | Magnification (n) | B | C | D | E |
| 1 | H | ×1.0 (OFF) | 0 | 0 | 0 | 0 |
| 2 | H | ×1.4 | 0 | 0 | 1 | 0 |
| 3 | H | ×2.0 | 0 | 0 | 0 | 1 |
| 4 | P | ×1.0 (OFF) | 1 | 0 | 0 | 0 |
| 5 | P | ×1.4 | 1 | 0 | 1 | 0 |
| 6 | C | ×1.0 (OFF) | 1 | 1 | 0 | 0 |
| 7 | C | ×1.4 | 1 | 1 | 1 | 0 |
| 8 | C | ×2.0 | 1 | 1 | 0 | 1 |
| 9 | C | ×2.8 | 1 | 1 | 1 | 1 |

In the example of Table 10, using the construction of the camera 1 shown in FIG. 11, by making the number of trimming magnifications (n) that may be selected by means of the selection switch 11' vary depending on the print format mode set by means of the mode setting switch 10', the trimming magnification (n) that may be set may be made subject to the print format mode. In other words, by cyclically alternating the display of the trimming magnification (n) from 1.0 to 1.4 to 2.0 and back to 1.0 in the H format, between 1.0 and 1.4 in the P format, and from 1.0 to 1.4 to 2.0 to 2.8 and back to 1.0 in the C format, the trimming magnification (n) that may be set may be made subject to the print format mode.

The trimming process includes a step in which a part of the frame image is enlarged during the printing of the frame image, and therefore the image quality is less (i.e., the resolution decreases) compared to printing in which no trimming is involved (hereinafter "regular printing"). The setting of a specified upper limit to the selectable trimming magnifications (n) from the standpoint of preventing image quality deterioration caused by enlargement was described above. In the current camera system, the amount of enlargement (magnification (m)) varies during regular printing, depending on which of the C, H and P print formats is used, and therefore, even if the upper limit for the trimming magnification (n) is the same for all the print formats, the quality of the image that deteriorates due to trimming using the maximum trimming magnification varies from one print format to another.

Figure 19:
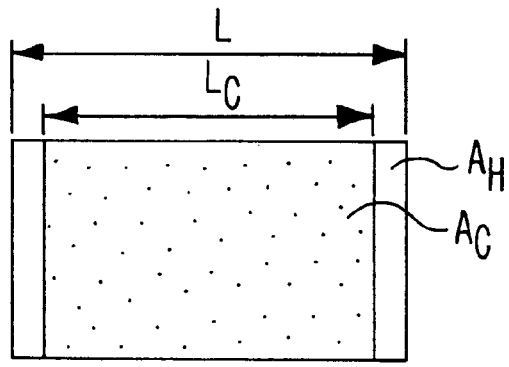
FIG. 19 is a drawing showing the C format print area of a frame image.
Figure 20:
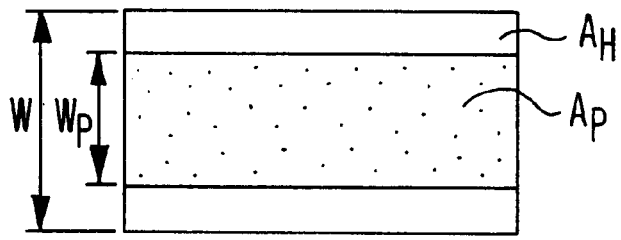
FIG. 20 is a drawing showing the P format print area of a frame image.
Figure 21:
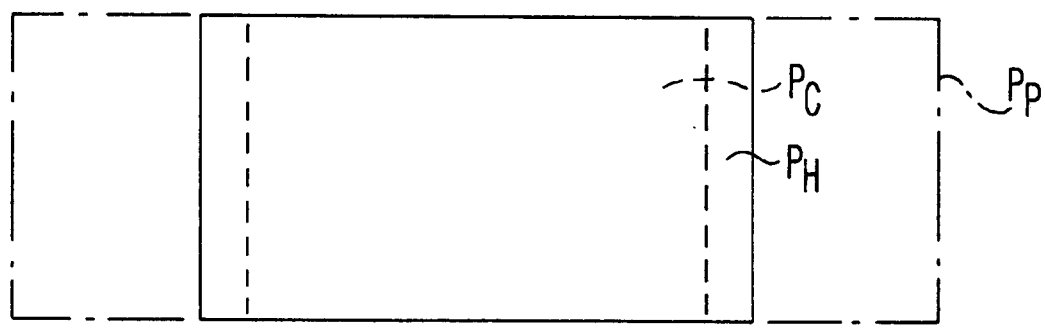
FIG. 21 is a drawing showing the print sizes in the C, H and P print formats, respectively.

FIGS. 19 and 20 show the print area AC of the frame image A for the C format, the print area AH in the H format, and the print area AP for the P format, respectively. FIG. 21 shows the print sizes (photographic paper sizes) PC, PH and PP for the C, H and P print formats. The relationship between the print area AH for the H format and the print area AC for the C format (the widths are the same while the lengths L and LC are different) is the same as the relationship between the print size PH for the H format and the print size PC for the C format. Therefore, during printing in the C format, printing using the print size PC is possible by enlarging the image in the print area AC by the magnification (mC) identical to the magnification (mH) for the H format (the magnification of the image in the print area AH to the print size PH).

On the other hand, during printing in the P format, while the width of the print size PP and the width of the print size PH in the H format are the same, the width WP of the print area AP is less than the width W of the print area AH in the H format (WP/W=0.6). Consequently, in order to enlarge the image in the print area AP to the print size PP, it is necessary to enlarge the image by the magnification (mH) for the H format and then enlarge it again by the magnification W/WP (=1.67), whereby the magnification (mP) for the P format results in (mH)×(W/WP).

Therefore, since the magnifications (mC), (mH) and (mP) in the regular printing in the C, H and P print formats have the relationship (mC):(mH):(mP)=1:1:1.67, if the maximum trimming magnification (N) for each print format is the same, the quality of the printed image that undergoes trimming using this maximum value (N) is the worst in the P format.

Where multiple trimming magnifications (n) are available for each print format and an upper limit is set for the trimming magnifications (n) in order to prevent image quality deterioration caused by enlargement, it is not desirable for the quality of the printed image using the maximum trimming magnification (N) to vary significantly from one print format to another. Therefore, it is preferred that the maximum trimming magnifications NC, NH and NP be set for the C, H and P print formats, respectively, such that the quality of the printed image trimmed using the maximum trimming magnification (N) does not vary from one print format to another (i.e., such that the variation among the print formats in the worst image deterioration case may be reduced).

Here, where the maximum trimming magnifications NC, NH and NP for the print formats C, H and P, respectively, are the same, the printed image trimmed using the maximum trimming magnification (N) would be the worst in image quality in the P format. Therefore, if the maximum trimming magnification NP is determined for the P format considering the allowable range of image deterioration due to trimming, the maximum trimming magnifications NC and NH for the C and H print formats should be set such that they meet the conditions NC≦NP×(mC/mP)=NP×(1/1.67) and NH×NP≦(mH/mP)=NP×(1/1.67). In other words, the maximum trimming magnifications NC and NH for the C and H formats should be set such that the condition NC or NH≦1.7×NP is met.

If the quality of the trimmed image using the maximum trimming magnification (N) is to be roughly the same for all the print formats, the maximum trimming magnification NC and NH for the C and H print formats should be set such that they meet the condition NC NH:NP=1:1:(1/1.67) ≈1.7:1.7:1.0. In addition, if the condition NC or NH≦1.7× NP is to be met, the maximum values NC, NH and NP may be set such that NC>NH>NP is true.

In the example of Table 10 above, the maximum trimming magnifications NC, NH and NP for the C, H and P print formats, respectively, are different from one another. Since their ratios are NC:NH:NP=2.8:2.0:1.4≈2.0:1.4:1.0, if a trimming magnification NC is set in the C format, the quality of the printed image would be beyond the allowed range of image quality deterioration. Therefore, it is preferred that the maximum trimming magnification NC for the C format be limited to approximately ×2.3 (1.4×1.67).

In Table 11, some of the trimming magnifications (n) in Table 10 are corrected in consideration of possible deterioration in image quality caused by trimming. In this table, the trimming magnifications (n) selectable for each print format are changed such that they will comprise a geometrical progression with a common ratio of approximately 1.3. Further, the maximum trimming magnification NP for the P format is limited to ×1.3, and the maximum trimming magnifications NC and NH for the C and H print formats are determined based on the maximum value NP such that NC or NH≦1.7×NP will be met. In Table 11, the number of selectable trimming magnifications (n) for the H format is increased by one from Table 10 and the maximum value NP is ×2.0. It is also envisioned that No. 4 is eliminated and the m value NP is reduced to ×1.7.

TABLE 11

| No. | Print Format | Trimming Magnification (n) | B | C | D | E |
|---|---|---|---|---|---|---|
| 1 | H | ×1.0 (OFF) | 0 | 0 | 0 | 0 |
| 2 | H | ×1.3 | 0 | 0 | 1 | 0 |
| 3 | H | ×1.7 | 0 | 0 | 0 | 1 |
| 4 | H | ×2.0 | 0 | 0 | 1 | 1 |
| 5 | P | ×1.0 (OFF) | 1 | 0 | 0 | 0 |
| 6 | P | ×1.3 | 1 | 0 | 1 | 0 |
| 7 | C | ×1.0 (OFF) | 1 | 1 | 0 | 0 |
| 8 | C | ×1.3 | 1 | 1 | 1 | 0 |
| 9 | C | ×1.7 | 1 | 1 | 0 | 1 |
| 10 | C | ×2.0 | 1 | 1 | 1 | 1 |

Since the print format information and trimming magnification information are optically written onto the edge areas of the film F, as described above, the print format as well as the trimming magnification, which is pseudo-zoom information, may be written onto the film F using a simple construction. Since the trimming information may be additionally written by means of a method that incorporates the optical writing method for writing the print format information in the advanced photo system in particular, the trimming information may be incorporated while compatibility is maintained.

In addition, because the setting of the trimming magnification is subject to the print format, an effective trimming magnification may be easily set for each print format.

Figure 22:
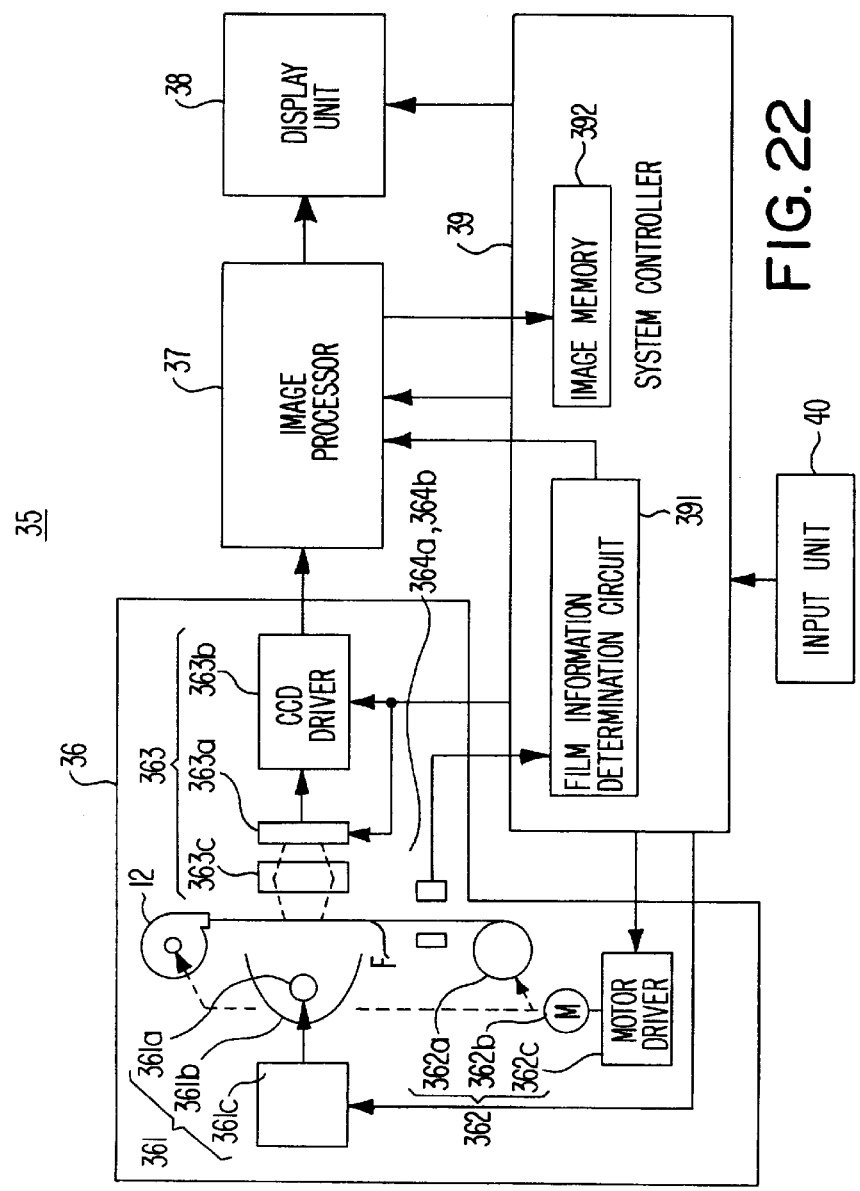
FIG. 22 is a block diagram showing one embodiment of a film image reproduction device having the film information reading device pertaining to the present invention.

FIG. 22 shows a block diagram showing one embodiment of the film image reduction device having the film information reading device that reads the film information written to the film F.

The film image reproduction device shown in this drawing reproduces the images captured in each frame of the film F on a display device such as a CRT.

The film image reproduction device 35 comprises an information reader 36 that can read the image information of each frame of the film F as well as the optically written film information, an image processor 37 that performs prescribed image processing of the image read by the information reader 36 based on the film information, a display unit 38 that reproduces the image of each frame based on the image data output from the image processor 37, a system controller 39 that comprehensively controls the operations of these components, and an input unit 40.

The information reader 36 has an illuminating unit 361 that illuminates each frame of the film F, a film feeder 362 that feeds the image of a frame to the prescribed reading position, an image reader 363 that reads the captured image of the frame and a film information reader 364 that reads the film information that is optically written for each frame of the film F.

The illuminating unit 361 has a lamp 361a, a reflective mirror 361b and a light emission control circuit 361c that controls the light emission from this lamp 361a, and illuminates the film F with a prescribed amount of light based on the control signal from the system controller 39. The film feeder 362 has a feeding roller 362a, a motor 362b that drives the feeding roller 362a and a motor driver 362c that controls the driving of the motor 362b, and feeds the film F to the prescribed reading position one frame at a time based on the control provided by the system controller 39 during image reading of each frame.

The image reader 363 has an area sensor 363a comprising color CCDs that read the captured image of the frame that is set at the prescribed reading position, a CCD driver 363b that controls the driving of the area sensor 363a, and an optical system 363c that forms an optical image of the frame image on the image pick-up surface of the area sensor 363a. The image reader 363 performs photoelectric conversion of the captured image of the frame into electric signals and inputs the image. The driving of the CCD driver 363b and the optical system 363c are controlled by the system controller 39.

Figure 23:
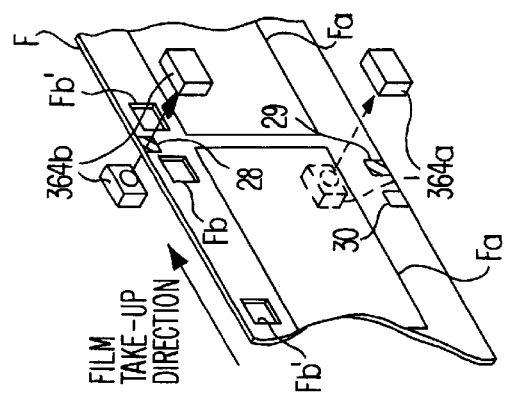
FIG. 23 is a perspective view of main components showing the locations of the photosensors in the film information reading device.

The film information reader 364 comprises a pair of photosensors 364a and 364b and a film information determination circuit 391 that is incorporated in the system controller 36. The photosensors 364a and 364b comprise photointerrupters, for example, as shown in FIG. 23, and are located in the moving path for the mark 28 written onto the top edge area of the film F and in the moving path for the marks 29 and 30 written onto the bottom edge area of the film F. When the marks 28 through 30 pass through the photointerrupters 364a and 364b, the level of light they receive changes, and the marks 28 through 30 are detected based on this change.

In an embodiment in which the marks 28 through 30 are written only onto the bottom edge area of the film F, the photosensor 364b may be omitted. It is also possible to use photoreflectors for the photosensors 364a and 364b instead of the photointerrupters.

The detection signals from the photosensors 364a and 364b (i.e., the data detection signals) are input to the system controller 39, and the contents of the data are determined by the film information determination circuit 391. In other words, where the data is written onto the film F in the fashion shown in FIG. 6, the print format and the trimming magnification are determined based on the bit patterns shown in Table 2. The result of this determination is output to the image processor 37 and is used for the generation of the image in the reproduction range.

The image processor 37 performs prescribed image processing to the image input from the image reader 363, including white balancing and gamma correction, and extracts the image of prescribed trimming area based on the print format and the trimming magnification input from the system controller 39. It then electronically enlarges the data for the extracted image based on the trimming magnification and outputs it to the display unit 38 and the system controller 39.

The display unit 38 displays the image to be reproduced by controlling the light emission for each pixel based on the image data thus input.

The system controller 39 reproduces and displays the image captured on the frames of the film F by comprehensively controlling the driving of the information reader 36, the image processor 37 and the display unit 38, and comprises a microcomputer. The system controller 39 has a film information determination circuit 391 that determines the print format information and the trimming information recorded onto the film F from the detection signals from the photosensors 364a and 364b, as well as an image memory 392 that saves the image for reproduction that is generated by the image processor 37.

The input unit 40 inputs various parameters regarding the reproduction of the image captured in each frame (such as the number of the frame to be reproduced and a reproduction start signal).

In the construction described above, when a roll of film F is inserted in the film feeder 362 and a reproduction start signal is input from the input unit 40, the first frame of the film F is fed to the prescribed image reading position and the photosensors 364a and 364b are moved relative to the both edge areas of the film F, whereby the data for the first frame is read. The contents of this data are determined by the film information determination circuit 391, and the result of this determination (print format and trimming magnification information) is output to the image processor 37.

The image captured in the first frame is then taken in by the image reader 363. After undergoing prescribed image processing such as white balancing and gamma correction by means of the image processor 37, this image is subjected to prescribed trimming adjustment based on the print format and trimming magnification data input from the system controller 39. In other words, if the data of No. 2 in Table 2 has been input from the system controller 39, for example, a center image comprising approximately 72% of the total image is extracted from the image data, as shown in FIG. 6(d), and image data is generated by enlarging the extracted image by ×1.4 (data for the extracted image that is enlarged to fill the frame). This image data is output to the display unit 38 and the system controller 39, whereupon an image that has gone through trimming adjustment is displayed on the display unit 38 and saved in the image memory 392 in the system controller 39.

The subsequent frames are sequentially reproduced and displayed on the display unit 39 using the same procedure. When the reproduction process is completed for all the frames instructed by the input unit 40, the reproduction operations stop. When the images captured on the frames of the film F are to be displayed on the display unit 38 using the same parameters, the image data stored in the image memory 392 is read to the display unit 38 without reading the film information or the image from the film F or performing image processing. Therefore, it is acceptable to have a construction in which an external memory device is used in place of the image memory 392 such that the images for reproduction output from the image processor 37 are stored in said memory device.

In this embodiment, the image in the trimming area is extracted by means of the image processor 37 based on the film information after the entire image captured on the frame is read by the image reader 363, but it is also acceptable if the image in the trimming area is read by the image reader 363 from the image captured on the frame based on the film information and trimming is performed regarding the extracted image by means of the image processor 37. In this way, the size of the image data processed by the image processor 37 becomes smaller, which makes faster processing possible.

In addition, in this embodiment, a device that reproduces the frame images on a display device such as a CRT was explained as the film image reproduction device, but this device can be replaced with a device that reproduces the frame images on a screen.

Further, in this embodiment, a film image reproduction device was explained as a device having the film information reading device that reads the film information written onto the film F, but the device that may be equipped with the film information reading device is not limited to film image reproduction devices such as photo-players (i.e., apparatus that display photo images). The film information reading device may be incorporated in a device that generates viewing images from the images captured on the frames of the film, such as a printing device that develops on photographic paper the images captured in each frame of the film or an index image comprising multiple frame images arranged in a matrix, or that forms images on regular paper, for example. In this case, if the display unit 38 is replaced with an image forming apparatus such as a printer in FIG. 22, for example, a printing device can be constructed.

The film information reading device may also be applied in a device that records the images for reproduction on an external recording medium such as a magnetic disk or an optical disk without displaying or printing images. This is done by replacing the display unit 38 with an external storage device in FIG. 22, for example.

Further, the film information reading device may also be applied in an image inputting device such as a film scanner in a system in which the frame images of the film are input into a personal computer, and instead of direct reproduction and display, they are reproduced on a display device or a screen or are printed on photographic paper or regular paper after desired processing is performed to them.

As described above, using the present invention, a film information writing device that writes film information comprising print format information and trimming information onto the film converts the print format information and the trimming magnification information that are set by means of a format setting means and a trimming setting means, respectively, into prescribed data comprising a bit pattern, and the film information is written onto the film surface based on this data, and therefore, both the print format information and the trimming magnification information may be written onto the film using a simple construction without making the film information writing member large.

In particular, since a print format and a trimming magnification may be selected independently of each other, the operation to set both parameters is easy. In addition, since the trimming information may be set in tandem with the print format information, an effective trimming magnification for each print format may be easily set. Further, since the number of trimming magnifications that may be set varies depending on the print format, the setting of an effective magnification for each print format is easier.

Further, the trimming magnifications, any of which may be set by means of the trimming information setting means as trimming information, comprise a geometrical progression in which the trimming magnifications change at a prescribed rate, and therefore, the user can easily select a desired trimming area.

Moreover, the number of information items that may be identified based on the bit patterns assigned to indicate print format information is larger than the number of the available print formats, and the number of information items that may be identified based on the bit patterns assigned to indicate trimming information is smaller than the number of the available trimming magnifications, wherein some of the available trimming magnifications are converted into data comprising a bit pattern which is a combination of (i) a bit pattern that was originally assigned to indicate a print format but that was not used for the original purpose and (ii) a bit pattern assigned to indicate trimming information, and therefore, the number of selectable trimming magnifications may be increased without increasing the number of data bits. This arrangement contributes to the simplification of the device and to cost reduction because it is not necessary to add more members to write data onto the film.

Furthermore, the trimming magnifications that may be set by means of the trimming information setting means comprise (i) a first group of trimming magnifications that form a geometrical progression the components of which change at a prescribed rate and (ii) a second group of trimming magnifications that are obtained by multiplying the trimming magnifications of the first group by a prescribed coefficient. A trimming magnification from the first group is converted into data comprising a bit pattern assigned to indicate trimming information and a trimming magnification from the second group is converted into a bit pattern comprising a combination of a bit pattern assigned to indicate trimming information and a bit pattern which was originally assigned to indicate print format information but was not used for the original purpose. Consequently, the trimming information may be written onto the film surface by easily adding it to the print format information while maintaining the compatibility with the print format writing standard of the advanced photo system.

In addition, the number of the available trimming magnifications is smaller than the number of data items that may be identified by means of bit patterns assigned to indicate trimming information, and trimming magnifications that have a trimming area in the center of the original image and trimming magnifications that have at least two trimming areas, including the center area, may be set, whereby a trimming magnification having a trimming area in the center of the original image is converted into data comprising a bit pattern assigned to indicate trimming information, and a trimming magnification having a trimming area other than the center of the original image is converted into data comprising a bit pattern other than those used for the trimming magnifications having a center trimming area. Consequently, different trimming areas may be set for one trimming magnification by effectively using the bit patterns assigned to indicate trimming information. As a result, the range of available trimming conditions is increased and the operability of the device increases.

Further, the film information is written in an area or areas other than the image area of each frame of the film, and therefore the film information may be written onto the film surface without compromising the captured image. In particular, because the print format information is written onto one side area along the length of rolled film and the trimming information is written onto both side areas or on the other side area along the length of rolled film, the writing may be easily adopted in a camera using the advanced photo system while maintaining compatibility with the print format information writing standard. Thus, the print format information and the trimming information may be clearly and reliably written onto the film.

Moreover, the trimming information is written in the area between the pair of perforations corresponding to each frame, and therefore the trimming information is not confused with these perforations during reading, allowing reliable reading and writing of trimming information. Also, the trimming information can be written near the location at which the print format information is written, and therefore, it is possible to construct the print format information writing member and the trimming information writing member as one unit or to use one member for both purposes, which contributes to making the information writing means compact and inexpensive. In particular, since the film information is optically written onto the film surface, the information writing member may be made small in size.

Using the present invention, a camera in which film information comprising print format information and trimming information can be written onto the film may be provided without increasing the size of the camera because the camera is equipped with the film information writing function pertaining to the present invention.

Using the present invention, the print format information and the trimming information written onto the film are read individually and the contents of said information are determined individually, and therefore, the film information written onto the film by means of the film information writing device pertaining to the present invention may be easily and accurately read.

Further, the image captured in a frame of the film is read while the print format information and the trimming information for the frame is read, and an image for viewing is created by extracting an image in the trimming area from the read image based on the print format information and the trimming information, or the print format information and the trimming information for the frame is read and a part of the image captured on the frame (the image in the trimming area) is read based on the print format information and the trimming information to create an image for viewing. Consequently, an image for viewing may be easily created using the print format information and the trimming information written onto the film.

Moreover, because recording of the viewing images on recording paper, or storage in a recording means or reproduction and display on a display device of said images are performed, the viewing images may be easily monitored.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A film information writing device that writes film information comprising print format information regarding a print format and trimming information regarding a trimming area of an original image onto the film, said film information writing device including:
   a format information setting device configured to selectively set print format information from among multiple preset print formats with different aspect ratios;
   a trimming information setting device configured to selectively set trimming information from among preset multiple trimming information items wherein the trimming information comprises a trimming magnification that defines a trimming area of the original image and wherein the trimming information setting device is operable independently from the format information setting device;
   a data converter configured to convert the film information set using the format information setting device and the trimming information setting device into prescribed data comprising a bit pattern; and
   a data writing device configured to write onto the film the data corresponding to the print format information and trimming information output from the data converter.

2. A film information writing device claimed in claim 1, wherein the print format information and trimming information are set independently of each other.

3. A film information writing device claimed in claim 1, wherein the print format information and trimming information are set in tandem with each other.

4. A film information writing device claimed in claim 3, wherein a number of trimming information items that can be set using the trimming information setting device varies depending on the print format information set using the format information setting device.

5. A film information writing device claimed in claim 1, wherein multiple trimming magnifications that can be set using the trimming information setting device are preset such that the trimming magnifications comprise a geometrical progression in which the component trimming magnifications change at a prescribed rate.

6. A film information writing device as claimed in claim 1,
   wherein said trimming magnification belongs to a group of multiple trimming magnifications that can be set in advance in tandem with a particular print format set using the format information setting device;
   wherein a maximum trimming magnification that can be set in tandem with at least one print format differs from maximum trimming magnifications that can be set in tandem with the other print formats.

7. A film information writing device claimed in claim 1,
   (i) wherein said data converter is configured to convert the format information and trimming information into said bit pattern by assigning said format information and trimming information to respective bit pattern combinations using a prescribed bit assignment rule; and
   (ii) wherein at least one bit pattern combination, when interpreted according to said prescribed bit assignment rule, is not usable by said film information writing device; and
   (iii) wherein said data converter is configured to redefine said at least one bit pattern in a manner inconsistent with said prescribed bit assignment rule, so as to define a combination which is usable by said film information writing device.

8. A film information writing device claimed in claim 7,
   (i) wherein the number of information items that can be identified based on the bit pattern comprising the print format information data is larger than the number of print formats that can be set using the format information setting device; and
   (ii) wherein the number of information items that can be identified based on the bit pattern comprising the trimming information data is smaller than the number of trimming magnifications that can be set using the trimming information setting device; and
   (iii) wherein the data converter is configured to convert some of the trimming information items set using the trimming information setting device into data comprising a bit pattern that comprises a combination of a bit pattern that was originally assigned to indicate a print format according to said prescribed bit assignment rule but is not used for that original purpose and a bit pattern assigned to indicate trimming information.

9. A film information writing device claim in claim 7, wherein said at least one unusable bit pattern combination is redefined to specify information regarding a trimming area which is not centered in a middle of a frame.

10. A film information writing device claimed in claim 1, wherein the film comprises rolled film that has, along its one edge, pairs of perforations that respectively correspond to each frame and that control the frame-by-frame feeding of the film, and the film information is written for each frame onto the non-image area of each frame of the rolled film.

11. A film information writing device claimed in claim 10, wherein the data corresponding to the print format information is written onto the non-image area in one edge area along the length of the rolled film and the data corresponding to the trimming information is written onto the non-image area in both edge areas along the length of the rolled film.

12. A film information writing device claimed in claim 10, wherein the data corresponding to the print format information is written onto the non-image area in one edge area along the length of the rolled film and the data corresponding to the trimming information is written onto the non-image area in the other edge area along the length of the rolled film.

13. A film information writing device claimed in claim 10, wherein the data corresponding to the trimming information is written between a pair of perforations for each frame on the edge area of the rolled film at which the perforations are located.

14. A film information writing device claimed in claim 10, wherein the data corresponding to the print format information is written onto the non-image area on one edge area along the length of the rolled film and the data corresponding to the trimming information is written near the area onto which the print format information data is written.

15. A film information writing device claimed in claim 1, wherein the data writing device comprises first and second data writing devices which are configured to expose the film based on the data output from the data converter, in order to optically write the film information onto the film.

16. A film information writing device as claimed in claim 1, wherein the writing device is used in a camera, and is configured to write film information that is set for each shot of the camera onto the film.

17. A film information writing method that writes film information comprising print format information regarding a print format and trimming information regarding a trimming area of an original image onto the film, said film information writing method including the steps of:

selectively setting print format information using a format information setting device, the print format information being set from among multiple preset print formats with different aspect ratios;

selectively setting trimming information using a trimming information setting device, the trimming information being set from among preset multiple trimming information items wherein the trimming information comprises a trimming magnification that defines a trimming area of the original image and wherein the trimming information setting device is operable independently from the format information setting device;

converting the film information set in the format information setting step and the trimming information setting step into prescribed data comprising a bit pattern; and writing onto the film the data corresponding to the print format information and trimming information output from the converting step.

18. A film information writing method claimed in claim 17, wherein the print format information and trimming information are set independently of each other.

19. A film information writing method claimed in claim 17, wherein the print format information and trimming information are set in tandem with each other.

20. A film information writing method claimed in claim 19, wherein a number of trimming information items that can be set varies depending on the print format information which is set.

21. A film information writing method claimed in claim 17,
wherein multiple trimming magnifications that can be set are preset such that the trimming magnifications comprise a geometrical progression in which the component trimming magnifications change at a prescribed rate.

22. A film information writing method as claimed in claim 17,
wherein said trimming magnification belongs to a group of multiple trimming magnifications that can be set in advance in tandem with a particular set print format;
wherein a maximum trimming magnification that can be set in tandem with at least one print format differs from maximum trimming magnifications that can be set in tandem with the other print formats.

23. A film information writing method claimed in claim 17,
(i) wherein said converting step converts the format information and trimming information into said bit pattern by assigning said format information and trimming information to respective bit pattern combinations using a prescribed bit assignment rule; and
(ii) wherein at least one bit pattern combination, when interpreted according to said prescribed bit assignment rule, is not usable by said film information writing device; and
(iii) wherein said converting step redefines said at least one bit pattern in a manner inconsistent with said prescribed bit assignment rule, so as to define a combination which is usable by said film information writing device.

24. A film information writing method claimed in claim 23,
(i) wherein the number of information items that can be identified based on the bit pattern comprising the print format information data is larger than the number of print formats that can be set; and
(ii) wherein the number of information items that can be identified based on the bit pattern comprising the trimming information data is smaller than the number of trimming magnifications that can be set; and
(iii) wherein the converting step converts some of the set trimming information items into data comprising a bit pattern that comprises a combination of a bit pattern that was originally assigned to indicate a print format according to said prescribed bit assignment rule but is not used for that original purpose and a bit pattern assigned to indicate trimming information.

25. A film information writing method claim in claim 23, wherein said at least one unusable bit pattern combination is redefined to specify information regarding a trimming area which is not centered in a middle of a frame.

26. A film information setting device that sets film information comprising print format information regarding a print format and trimming information regarding a trimming area of an original image, comprising:

a format information setting device configured to selectively set print format information from among multiple at least three preset print formats with different aspect ratios;

a trimming information setting device configured to selectively set trimming information from among preset multiple trimming information items wherein the trimming information comprises a trimming magnification that defines a trimming area of the original image and wherein the trimming information setting device is operable independently the format information setting device;

wherein a number of trimming information items that can be set using the trimming information setting device varies depending on the print format information set using the format information setting device.

27. A film information setting device claimed in claim 26, further comprising:

a data converter configured to convert the film information set using the format information setting device and the trimming information setting device into prescribed data comprising a bit pattern.

28. A film information setting device claimed in claim 26, wherein the print format information and trimming information are set either independently of each other or in tandem with each other.

29. A film information setting device claimed in claim 26, wherein multiple trimming magnifications that can be set using the trimming information setting device are preset such that the trimming magnifications comprise a geometrical progression in which the component trimming magnifications change at a prescribed rate.

30. A film information setting device claimed in claim 27, (i) wherein said data converter is configured to convert the format information and trimming information into said bit pattern by assigning said format information and trimming information to respective bit pattern combinations using a prescribed bit assignment rule; and (ii) wherein at least one bit pattern combination, when interpreted according to said prescribed bit assignment rule, is not usable by said film information writing device; and (iii) wherein said data converter is configured to redefine said at least one bit pattern in a manner inconsistent with said prescribed bit assignment rule, so as define a combination which is usable by said film information writing device.

31. A film information setting device claimed in claim 30, (i) wherein the number of information items that can be identified based on the bit pattern comprising the print format information data is larger than the number of print formats that can be set using the format information setting device; and (ii) wherein the number of information items that can be identified based on the bit pattern comprising the trimming information data is smaller than the number of trimming magnifications that can be set using the trimming information setting device; and (iii) wherein the data converter is configured to convert some of the trimming information items set using the trimming information setting device into data comprising a bit pattern that comprises a combination of a bit pattern that was originally assigned to indicate a print format according to said prescribed bit assignment rule but is not used for that original purpose and a bit pattern assigned to indicate trimming information.

32. The film information setting device claimed in claim 1, wherein said multiple print formats include a panoramic format, and the number of trimming information items that can be set for said panoramic format is less than for other formats.

33. The film information setting device claimed in claim 1, wherein said multiple print formats include:

a "C" format defining a standard format;

an "H" format defining a high vision format; and a "P" format defining a panoramic format.

34. The film information setting device claimed in claim 33, wherein the maximum trimming magnifications NC, NH and NP that may be set in tandem with each of the C, H and P print formats, respectively, meet the condition $NC \geq NH > NP$.

35. The film information setting device claimed in claim 33, wherein the maximum magnifications NC, NH and NP that may be set in tandem with each of the C, H and P print formats, respectively, meet the condition $NC:NH:NP= 1.7:1.7:1$.

36. The film information setting device claimed in claim 26, further comprising:

a data writing device configured to write onto the film the data corresponding to the print format information and trimming information set by said format information setting device and said trimming information setting device.

* * * * *